(12) United States Patent
Hosseini

(10) Patent No.: US 11,802,796 B2
(45) Date of Patent: Oct. 31, 2023

(54) MONOLITHIC ASSEMBLY OF MINIATURE REFLECTIVE CYCLICAL SPATIAL HETERODYNE SPECTROMETER INTERFEROMETRY SYSTEMS

(71) Applicant: California Institute of Technology, Pasadena, CA (US)

(72) Inventor: Seyedeh Sona Hosseini, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/643,157

(22) Filed: Dec. 7, 2021

(65) Prior Publication Data
US 2022/0178751 A1    Jun. 9, 2022

Related U.S. Application Data

(60) Provisional application No. 63/122,144, filed on Dec. 7, 2020.

(51) Int. Cl.
*G01J 3/45*    (2006.01)
*G01J 3/02*    (2006.01)
(Continued)

(52) U.S. Cl.
CPC ............... *G01J 3/45* (2013.01); *G01J 3/021* (2013.01); *G01J 3/0202* (2013.01); *G01J 3/18* (2013.01); *G01J 3/4531* (2013.01)

(58) Field of Classification Search
CPC .. G01J 3/0202; G01J 3/021; G01J 3/18; G01J 3/45; G01J 3/0291; G01J 3/4531; G01J 3/4532
See application file for complete search history.

(56) References Cited

U.S. PATENT DOCUMENTS 4,487,478 A    12/1984  Jackson
5,030,007 A     7/1991  Calhoun et al.
(Continued)

FOREIGN PATENT DOCUMENTS

CN    102072769 A    5/2011
CN    102486408 A    6/2012
(Continued)

OTHER PUBLICATIONS

Lenzner et al., "Concerning the Spatial Heterodyne Spectrometer", Optics Express, Jan. 22, 2016, vol. 24, No. 2, pp. 1829-1839.
(Continued)

*Primary Examiner* — Violeta A Prieto

(57) ABSTRACT

Novel monolithic reflective spatial heterodyne spectrometers (SHS) interferometer systems are presented. Monolithic systems in accordance with the invention have a single supporting structure wherein input optics, output optics, a flat mirror, a roof mirror, and a symmetric grating are affixed. Embodiments of the invention contain only fixed parts, and the optics do not move in relation to the supporting structure. Embodiments of the present invention enables smaller, lighter, and more robust reflective SHS systems as compared to conventional interferometry. Additionally, embodiments of the present invention require less time and skill for construction and maintenance, and is a better economic option. Additional embodiments can include multiple interferometer systems in a single supporting structure.

20 Claims, 13 Drawing Sheets
(9 of 13 Drawing Sheet(s) Filed in Color)

(51) Int. Cl.
*G01J 3/18* (2006.01)
*G01J 3/453* (2006.01)

(56) References Cited

U.S. PATENT DOCUMENTS

| | | | |
|---|---|---|---|
| 5,059,027 A | 10/1991 | Roesler et al. | |
| 7,535,572 B2 | 5/2009 | Englert | |
| 7,773,229 B2 | 8/2010 | Harlander et al. | |
| 7,903,252 B2 | 3/2011 | Larsen et al. | |
| 8,018,597 B2 | 9/2011 | Scott | |
| 8,355,120 B2 | 1/2013 | Englert et al. | |
| 11,237,056 B2* | 2/2022 | Hosseini | G01J 3/0218 |
| 2005/0094155 A1 | 5/2005 | Hill et al. | |
| 2005/0248769 A1 | 11/2005 | Weitzel | |
| 2009/0051899 A1 | 2/2009 | Harlander et al. | |
| 2009/0231592 A1 | 9/2009 | Harlander et al. | |
| 2009/0316159 A1* | 12/2009 | Scott | G01J 3/1895 356/454 |
| 2012/0140219 A1* | 6/2012 | Cleary | G01J 3/0202 359/221.3 |
| 2013/0114062 A1 | 5/2013 | Liesener | |
| 2013/0135622 A1 | 5/2013 | Bleier et al. | |
| 2013/0188181 A1* | 7/2013 | Angel | G01J 3/14 356/301 |
| 2014/0029004 A1 | 1/2014 | Bodkin | |
| 2014/0247447 A1* | 9/2014 | Angel | G01N 21/65 356/301 |
| 2015/0030503 A1* | 1/2015 | Angel | G01J 3/45 422/82.05 |
| 2015/0241280 A1 | 8/2015 | Lenzner | |
| 2016/0138903 A1 | 5/2016 | Zhang et al. | |
| 2018/0128683 A1* | 5/2018 | Hosseini | G01J 3/18 |
| 2021/0302305 A1* | 9/2021 | Hosseini | G01J 3/4531 |

FOREIGN PATENT DOCUMENTS

| | | |
|---|---|---|
| CN | 105318969 A | 2/2016 |
| CN | 110337580 A | 10/2019 |
| JP | S522484 A | 1/1977 |
| JP | H04500128 A | 1/1992 |
| JP | 2005533244 A | 11/2005 |
| JP | 2009535621 A | 10/2009 |
| JP | 2015111157 A | 6/2015 |
| JP | 2019533811 A | 11/2019 |
| JP | 7032395 B2 | 2/2022 |
| KR | 1020120042694 A | 5/2012 |
| WO | 2018085863 A1 | 5/2019 |
| WO | WO-2021096588 A1 * | 5/2021 |

OTHER PUBLICATIONS

Lewis et al., "Handbook of Raman Spectroscopy, from the Research Laboratory to the Process Line", Marcel Dekker, Inc., New York, Basel, 2001, 1049 pgs., (presented in five parts).

Linsky et al., "The intrinsic extreme ultraviolet fluxes of f5 v to m5 v stars", The Astrophysical Journal, Dec. 12, 2013. 780: 61, 11 pgs.

Litzen et al., "How Fourier Transform Spectroscopy Can Be Used for Measurement of Atomic Parameters of Astrophysical Importance", Laboratory and Astronomical High Resolution Spectra, ASP Conference Series, vol. 81, 1995, pp. 167-181.

Llama et al., "Transiting the Sun: The Impact of Stellar Activity on X-Ray and Ultraviolet Transits", The Astrophysical Journal, Mar. 20, 2015, vol. 802: 41, 10 pgs.

LT Ultra, "LT Ultra turning machine ultrasonic assisted ultra-precision turning of steel", YouTube, Apr. 1, 2019, Retrieved from: https://www.youtube.com/watch?v=hyrhy_FG62E, 3 pgs.

Maillard, "Signal-to-noise ratio and astronomical fourier transform spectroscopy", International Astronimical Union, G. Cayrel de Strobel and M. Spite (eds.), The Impact of Very High SIN Spectroscopy on Stellar Physics, 1988, pp. 71-78.

Menager et al., "Calculation of the H Lyman alpha emission of the hot Jupiters HD 209458b and HD 189733b", Icarus, Mar. 13, 2013, vol. 226, pp. 1709-1718.

Mierkiewicz et al., "Detection of Diffuse Interstellar [O II] Emission from the Milky Way Using Spatial Heterodyne Spectroscopy", The Astrophysical Journal, Oct. 10, 2006, vol. 650, No. 1, pp. L63-L66.

Mierkiewicz et al., "First light performance of a near UV spatial heterodyne spectrometer for interstellar emission line studies", Proceedings of SPIE vol. 5492, Ground-based Instrumentation for Astronomy, Sep. 30, 2004, pp. 751-766.

Milster et al., "Coherence and Fringe Localization", 2006, Chapter 5, pp. 41-63.

Milster et al., "Coherence and Fringe Localization", 2006, Chapter 5, pp. 9-46.

Mordasini et al., "Characterization of exoplanets from their formation. II. The planetary mass-radius relationship", Astronomy & Astrophysics, Aug. 26, 2012, vol. 547:A112, 36 pgs.

Mumma et al., "Strong release of methane on Mars in northern summer 2003", Science, Feb. 20, 2009, vol. 323, No. 5917, pp. 1041-1045.

Nathaniel, "Spatial Heterodyne Raman Spectroscopy", Submitted for the Degree of Doctor of Philosophy from the University of Surrey, Sep. 2011, 175 pgs.

Nathaniel et al., "A Compact Spatial Heterodyne Remote Raman Spectrometer for Mars Exploration", 62nd International Astronautical Congress 2011, Space Exploration Symposium (A3), Mars Exploration—Part 2 (3B), 1 pg.

Nathaniel et al., "Spatial Heterodyne Raman Spectroscopy", 42nd Lunar and Planetary Science Conference, 2011, 2 pgs.

Newman, "An introduction to off-axis parabolic mirrors: OPTI 521 Tutorial", Retrieved from: https://wp.optics.arizona.edu/optomech/wp-content/uploads/sites/53/2016/10/521_Tutorial_Newman_Kevin.pdf, Oct. 21, 2013, 7 pgs.

Nichols et al., "Hubble space telescope observations of the nuv transit of wasp-12b", The Astrophysical Journal, Apr. 10, 2015, vol. 803: 9, 5 pgs.

Nikzad et al., "Delta-doped electron-multiplied CCD with absolute quantum efficiency over 50% in the near to far ultraviolet range for single photon counting applications", Applied Optics, Jan. 20, 2012, vol. 51, No. 3, pp. 365-369.

Orsel et al., "Heterodyne interferometric polarization coherent anti-Stokes Raman scattering (HIP-CARS) spectroscopy", Journal of Raman Spectroscopy, Feb. 25, 2010, vol. 41, pp. 1678-1681.

Oshagh et al., "Effect of stellar activity on the high precision transit light curve", EPJ Web of Conferences, 2015, vol. 101, 05003, 5 pgs.

Owen et al., "Magnetically controlled mass-loss from extrasolar planets in close orbits", Monthly Notices of the Royal Astronomical Society, Jul. 9, 2014, vol. 444, pp. 3761-3779.

Pepe et al., "Instrumentation for the detection and characterization of exoplanets", Nature, Sep. 18, 2014, vol. 513, No. 7518, pp. 358-366.

Perkins, "Spatial Heterodyne Spectroscopy: Modeling and Interferogram Processing", Thesis, Rochester Institute of Technology, Jul. 29, 2013, 134 pgs.

Perkins et al., "Spatial heterodyne spectrometer: modeling and interferogram processing for calibrated spectral radiance measurements", Proc. of SPIE, vol. 8870, Sep. 23, 2013, 88700R, doi: 10.1117/12.2023765, 14 pgs.

Pont et al., "Detection of atmospheric haze on an extrasolar planet: the 0.55-1.05 μm transmission spectrum of HD 189733b with the HubbleSpaceTelescope", Monthly Notices of the Royal Astronomical Society, 2008, vol. 385, No. 1, pp. 109-118.

Pont et al., "The prevalence of dust on the exoplanet HD 189733b from Hubble and Spitzer observations", Monthly Notices of the Royal Astronomical Society, May 1, 2013, vol. 432, pp. 2917-2944.

Pryor et al., "The Galileo and Pioneer Venus ultraviolet spectrometer experiments—Solar Lyman-alpha latitude variation at solar maximum from interplanetary Lyman-alpha observations", The Astrophysical Journal, Jul. 20, 1992, vol. 394, pp. 363-377.

Reynolds et al., "The Wisconsin H-Alpha Mapper (WHAM): A Brief Review of Performance Characteristics and Early Scientific Results" Publications of the Astronomical Society of Australia, 1998, vol. 15, pp. 14-18.

Ribak et al., "Revealing bio-lines of exoplanets by Fourier spectroscopy", Proc. of SPIE vol. 9146, Jul. 24, 2014, doi: 10.1117/12.2057372, 7 pgs.

(56) References Cited

OTHER PUBLICATIONS

Roesler, "An Overview of the SHS Technique and Applications", Optical Society of America, OSA Technical Digest Series, Fourier Transform Spectroscopy/ Hyperspectral Imaging and Sounding of the Environment, Feb. 11-15, 2007, 3 pgs.

Roesler et al., "An Overview of Spatial Heterodyne Spectroscopy", University of Wisconsin, 20 pgs.

Roesler et al., "Far-Ultraviolet Imaging Spectroscopy of Io's Atmosphere with HST/STIS", Science, Jan. 15, 1991, vol. 283, pp. 353-357.

Roesler et al., "Spatial Heterodyne Spectroscopy for Atmospheric Remote Sensing", SPIE Conference on Optical Spectroscopic Techniques and Instrumentation for Atmospheric and Space Research III, Denver, Colorado, Jul. 1999, SPIE vol. 3756, pp. 337-345.

Roesler et al., "Spatial Heterodyne Spectroscopy: An Emerging Technology for Interference Spectroscopy", Hubble's Science Legacy: Future Optical-Ultraviolet Astronomy from Space, ASP Conference Series, 2003, vol. 291, pp. 395-398.

Roesler et al., "Spatial Heterodyne Spectroscopy: Interferometric Performance at any Wavelength Without Scanning", SPIE vol. 1318, Optical Spectroscopic Instrumentation and Techniques for the 1990s, Dec. 1, 1990, pp. 234-243.

Rogerson et al., "Spectrophotometric Results from the Copernicus Satellite. I. Instrumentation and Performance", The Astrophysical Journal, May 1, 1973, vol. 181, pp. L97-L102.

Rothman et al., "The HITRAN 2008 molecular spectroscopic database", Journal of Quantitative Spectroscopy & Radiative Transfer, Feb. 13, 2009, vol. 110, p. 533-572.

Sahai et al., "A Pilot Deep Survey for X-Ray Emission from fuvAGB Stars", The Astrophysical Journal, Sep. 1, 2015, vol. 810: 77, 9 pgs.

Sahai et al., "Binarity in Cool Asymptotic Giant Branch Stars: A Galex Search for Ultraviolet Excesses", Astrophysical Journal, Jul. 12, 2008, vol. 689(1274), 14 pgs.

Sahai et al., "Multipolar Bubbles and Jets in Low-Excitation Planetary Nebulae: Toward a New Understanding of the Formation and Shaping of Planetary Nebulae", The Astronomical Journal, Sep. 1998, vol. 116, pp. 1357-1366.

Sahai et al., "Strong Variable Ultraviolet Emission from Y Gem: Accretion Activity in an AGB Star with a Binary Companion?", The Astrophysical Journal Letters, Oct. 20, 2011. vol. 740:L39, 4 pgs.

Sahai et al., "The Astrosphere of the Asymptotic Giant Branch Star CIT 6". The Astronomical Journal, Oct. 2014, vol. 148, No. 74, 8 pgs.

Sahai et al., "The Astrosphere of the Asymptotic Giant Branch Star IRC+10216", The Astrophysical Journal Letters, Mar. 10, 2010, vol. 711, pp. L53-L56.

Sahai et al., "Young Planetary Nebulae: Hubble Space Telescope Imaging and a New Morphological Classification System", The Astrophysical Journal, Apr. 2011, vol. 141:134, 31 pgs.

Samuele et al., "Experimental progress and results of a visible nulling coronagraph", IEEE Aerospace Conference, 2007, 9 pgs.

Saur et al., "Plasma Interaction of Io with its plasma torus", Io's Plasma Interaction, 2006, pp. 537-560.

Scott et al., "Spatial Heterodyne Spectrometer for FLEX", Proc. of SPIE vol. 6744, Sensors, Systems, and Next-Generation Satellites XI, Oct. 26, 2007, 11 pgs.

Serio et al., "The variation of Io's auroral footprint brightness with the location of Io in the plasma torus", Icarus, Apr. 27, 2008, vol. 197, No. 1, pp. 368-374.

Sheinis et al., "A spatial heterodyne spectrometer for diffuse H-α spectroscopy", Proc. of SPIE vol. 7014, Jul. 9, 2008, 13 pgs.

Shkolnik et al., "Predicting Lyα and Mg II Fluxes from K and M Dwarfs Using Galaxy Evolution Explorer Ultraviolet Photometry", The Astrophysical Journal Letters, Nov. 20, 2014, vol. 796, L20, 6 pgs.

Sirothia et al., "Search for 150 MHz radio emission from extrasolar planets in the TIFR GMRT Sky Survey", Astronomy and Astrophysics, Jan. 7, 2014, vol. 562, A108, 9 pgs.

Slanger et al., "Energetic Oxygen in the Upper Atmosphere and the Laboratory", Chemical Reviews, Aug. 15, 2003, vol. 103, No. 12, 82 pgs.

Smith et al., "Imaging spatial heterodyne spectroscopy: theory and practice", SPE Conference on Infrared Technology and Applications XXV, Orlando, Florida, Apr. 1999, SPIE vol. 3698, pp. 925-931.

Smith et al., "IRISHS, the Infrared Imaging Spatial Heterodyne Spectrometer: a new pushbroom Fourier transform ultraspectral imager with no moving parts", SPIE Conference on Infrared Technology and Applications XXV, Orlando, Florida, Apr. 1999, SPIE vol. 3698, pp. 501-509.

Smith et al., "Transport of ionizing radiation in terrestrial-like exoplanet atmospheres", Icarus, Jun. 2, 2004. vol. 171, 59 pgs.

Snellen et al., "The orbital motion, absolute mass, and high-altitude winds of exoplanet HD209458b", Nature, 2010, 465(7301): pp. 1049-1051.

Squyres et al., "Vision and Voyages for Planetary Science 2013-2022", The National Academies, National Research Council, 2012, 32 pgs.

Steffl, "The Io plasma torus during the Cassini encounter with Jupiter: Temporal, radial and azimuthal variations", 2005 Thesis, University of Colorado at Boulder, Colorado, USA, 219 pgs.

Stephan et al., "Interplanetary H Lyα observations from a sounding rocket", The Astrophysical Journal, Sep. 20, 2001, vol. 559, pp. 491-500.

Stevens et al., "The diurnal variation of polar mesospheric cloud frequency near 55°N observed by SHIMMER", Journal of Atmospheric and Solar-Terrestrial Physics, 2009, vol. 71, pp. 401-407.

Stewart, "Design and operation of the Pioneer Venus Orbiter ultraviolet spectrometer", IEEE Transactions on Geoscience and Remote Sensing, Jan. 1980, vol. GE.I8, No. 1, pp. 65-70.

Strange et al., "Transmission Raman Measurements Using a Spatial Heterodyne Raman Spectrometer (SHRS)", Applied Spectroscopy, Mar. 18, 2016, vol. 71, No. 2, pp. 250-257.

Thomas et al., "OGO 5 Measurements of the Lyman Alpha Sky Background", Astronomy & Astrophysics, 1971, vol. 11, pp. 218-233.

Tian et al., "High stellar FUV/NUV ratio and oxygen contents in the atmospheres of potentially habitable planets", Earth and Planetary Science Letters, Jan. 1, 2014, 21 pgs.

Trammell et al., "Hot Jupiter Magnetospheres", The Astrophysical Journal, Feb. 20, 2011, vol. 728:152, 24 pgs.

Vidal-Madjar et al., "An extended upper atmosphere around the extrasolar planet HD209458b", Nature, Mar. 13, 2003. vol. 442, No. 6928, pp. 143-146.

Vidal-Madjar et al., "Detection of Oxygen and Carbon in the Hydrodynamically Escaping Atmosphere of the Extrasolar Planet HD 209458b", The Astrophysical Journal, Mar. 20, 2004, vol. 604, No. 1, pp. L69-L72.

Vidotto et al., "Early UV ingress in wasp-12b: measuring planetary magnetic fields", The Astrophysical Journal Letters, Oct. 20, 2010, vol. 722, pp. L168-L172.

Wan et al., "Development of stable monolithic wide-field Michelson interferometers", Applied Optics, Jul. 20, 2011, vol. 50, No. 21, pp. 4105-4114.

Watchorn et al., "8446-Angstrom observations of neutral oxygen with the Spatial Heterodyne Spectrometer at Millstone Hill", Proc. of SPIE vol. 7438, Sep. 23, 2009, 11 pgs.

Watchorn et al., "Development of the Spatial Heterodyne Spectrometer for VUV remote sensing of the interstellar medium", Proceedings of SPIE vol. 4498, UV/EUV and Visible Space Instrumentation for Astronomy and Solar Physics, Dec. 10, 2001, pp. 284-295.

Watchorn et al., "Evaluation of payload performance for a sounding rocket vacuum ultraviolet spatial heterodyne spectrometer to observe C IV lambda lambda 1550 emissions from the Cygnus Loop", Applied Optics, Jun. 10, 2010, vol. 49, No. 17, pp. 3265-3273.

Watchorn et al., "First light for the Bowen fluorescence spatial heterodyne spectrometer at Millstone Hill Observatory", Proc. of SPIE vol. 6689, Solar Physics and Space Weather Instrumentation II, Oct. 3, 2007, 9 pgs.

(56) References Cited

OTHER PUBLICATIONS

Watchorn et al., "Single- and dual-wavelength monolithic spatial heterodyne spectrometers for Fraunhofer line discrimination spectroscopy", Proc. of SPIE vol. 7457, Aug. 17, 2009, 13 pgs.
Webster et al., "Determining the local abundance of Martian methane and its 13C/12C and D/H isotopic ratios for comparison with related gas and soil analysis on the 2011 Mars Science Laboratory (MSL) mission", Planetary and Space Science, 2011, vol. 59, pp. 271-283.
Webster et al., "Low upper limit to methane abundance on Mars", Science, Sep. 19, 2013, vol. 342: 6156, 5 pgs.
Webster et al., "Mars Methane Detection and Variability at Gale Crater", Science, Jan. 23, 2015, vol. 347, pp. 415-417.
Witte et al., "Recent results on the parameters of the interstellar helium from the ULYSSES/GAS experiment", Space Science Reviews, 1996, vol. 78, pp. 289-296.
Wood et al., "Evidence for a weak wind from the young sun", The Astrophysical Journal Letter, Feb. 1, 2014, vol. 781, L33, 5 pgs.
Woolf, "Signal-to-Noise Ratios in Multiplex and Scanning Spectrometers" Applied Optics, Oct. 1964. vol. 3, No. 10, p. 1195.
Wu et al., "Stand-off Detection of Chemicals by UV Raman Spectroscopy", Applied Spectroscopy, Feb. 7, 2000, vol. 54, No. 6, pp. 801-806.
Xiangli et al., "Large aperture spatial heterodyne imaging spectrometer: Principle and experimental results", Optics Communications, Sep. 14, 2015, vol. 357, pp. 148-155.
Yoshioka et al., "Feasibility study of EUV spectroscopic observation of the Io plasma torus from the earth-orbiting satellite EXCEED", Planetary and Space Science, 2012, vol. 62, pp. 104-110.
Englert et al., "Doppler Asymmetric Spatial Heterodyne Spectroscopy (DASH): An innovative concept for measuring winds in planetary atmospheres", Proc. of SPIE vol. 6303, Atmospheric Optical Modeling, Measurement, and Simulation II, Sep. 1, 2006, 9 pgs.
Englert et al., "Doppler asymmetric spatial heterodyne spectroscopy (DASH): concept and experimental demonstration", Applied Optics, Oct. 10, 2007, vol. 46, No. 29, pp. 7298-7307.
Englert et al., "First results from the Spatial Heterodyne Imager for Mesospheric Radicals (SHIMMER): Diurnal variation of mesospheric hydroxyl", Geographical Research Letters, Oct. 8, 2008, vol. 35, L19813, doi: 10.1029/2008GL035420, 5 pgs.
Englert et al., "Flatfielding in spatial heterodyne spectroscopy", Applied Optics, Jul. 1, 2006, vol. 45, No. 19, pp. 4583-4590.
Englert et al., "Michelson Interferometer for Global High-Resolution Thermospheric Imaging (MIGHTI): Instrument Design and Calibration", Space Science Reviews, Oct. 2017, vol. 212, No. 1-2, pp. 553-584, doi: 10.1007/s11214-017-0358-4.
Englert et al., "MIGHTI: The Spatial Heterodyne Instrument for Thermospheric Wind Measurements on Board the ICON Mission", Optical Society of America, Fourier Transform Spectroscopy, Mar. 1-4, 2015, 3 pgs.
Englert et al., "Spatial heterodyne spectroscopy at the Naval Research Laboratory", Applied Optics, Nov. 1, 2015, vol. 54, No. 31, pp. F158-F163.
Englert et al., "Spatial Heterodyne Spectroscopy: An Emerging Optical Technique for Heliophysics and Beyond", Concept Paper for NRC Space Studies Board, Oct. 2010, 7 pgs.
Erskine, "An Externally Dispersed Interferometer Prototype for Sensitive Radial Velocimetry: Theory and Demonstration on Sunlight", Publications of the Astronomical Society of the Pacific, Feb. 2003, vol. 115, pp. 255-269.
Fink, "A taxonomic survey of comet composition 1985-2004 using CCD spectroscopy", Icarus, Jan. 27, 2009, vol. 201, pp. 311-334.
Florjanczyk et al., "Development of a slab waveguide spatial heterodyne spectrometer for remote sensing", Proc. of SPIE vol. 7594, Feb. 17, 2010, 10 pgs.
Fontaine et al., "Fourier-transform, integrated-optic spatial heterodyne spectrometer on a silica-based planar waveguide with 1GHz resolution", Optics Letters, Aug. 15, 2011, vol. 36, No. 16. pp. 3124-3126.
Ford et al., "Overview of the advanced camera for surveys on-orbit performance", Proc. SPIE 4854, 2003, pp. 81-94.
Formisano et al., "Detection of Methane in the Atmosphere of Mars", Science, Dec. 3, 2004, vol. 306, pp. 1758-1761.
Fossati et al., "Absorbing Gas around the Wasp-12 Planetary System", The Astrophysical Journal Letters, Apr. 1, 2013, vol. 766: L20, 6 pgs.
Fossati et al., "Characterising exoplanets and their environment with UV transmission spectroscopy", eprint arXiv:1503.01278v1, Mar. 4, 2015, 4 pgs.
Foster et al., "Spatial-heterodyne spectrometer for transmission—Raman observations", Optics Express, Jan. 23, 2017, vol. 25, No. 2., pp. 1598-1604.
France et al., "The far-ultraviolet "continuum" in protoplanetary disk systems. I. Electron-impact H2 and accretion shocks", The Astrophysical Journal, Mar. 1, 2011, vol. 729: 7, pp. 1-12.
Fray et al., "Sublimation of ices of astrophysical interest: A bibliographic review", Planetary and Space Science, Sep. 20, 2009, vol. 57 vol. 14-15, pp. 2053-2080.
Frisch et al., "The Galactic Environment of the Sun: Interstellar Material Inside and Outside of the Heliosphere", Space Science Reviews, May 14, 2009, vol. 146, pp. 235-273.
Gardner et al., "First performance results of a new field-widened spatial heterodyne spectrometer for geocoronal Hα research", Journal of Geophysical Research: Space Physics, Jan. 9, 2017, vol. 122, pp. 1373-1385, doi: 10.1002/2016JA022625.
Gaudi, "Exoplanet program analysis group report", 223rd AAS Meeting, Wasington, DC., Apr. 2013, 19 pgs.
Gaudi et al., "Exoplanet Exploration Program Analysis Group (ExoPAG) Report to Paul Hertz Regarding Large Mission Concepts to Study for the 2020 Decadal Survey", Large Mission Concepts for Study, Oct. 6, 2015, 22 pgs.
Ghaffarian, "Update on CGA packages for space applications", Microelectronics Reliability, 2016. 11881, 41 pgs.
Gomer, "The Development of a Spatial Heterodyne Spectrometer for Raman Spectroscopy", Thesis, University of South Carolina, 2012, 24 pgs.
Gomer et al., "Raman Spectroscopy Using a Spatial Heterodyne Spectrometer: Proof of Concept", Applied Spectroscopy, May 11, 2011, vol. 65, No. 8, pp. 849-857.
Gomer et al., "The development of a wide-field, high-resolution UV Raman hyperspectral imager", Proceedings of the SPIE, vol. 9455, Chemical, Biological, Radiological, Nuclear, and Explosives (CBRNE) Sensing XVI, May 19, 2015, 9 pgs.
Guillot et al., "Giant Planets at Small Orbital Distances", Astrophysical Journal Letters, 1996, 19 pgs.
Guyon, "Limits of adaptive optics for high-contrast imaging", The Astrophysical Journal, Aug. 10, 2005, vol. 629, pp. 592-614.
Guyon et al., "Theoretical limits on extrasolar terrestrial planet detection with coronagraphs", The Astrophysical Journal, Nov. 2006, vol. 167, pp. 81-99.
Hallis et al., "Evidence for primordial water in Earth's deep mantle", Science, Nov. 13, 2015, vol. 350, pp. 795-797.
Harding et al., "The MIGHTI Wind Retrieval Algorithm: Description and Verification", Space Science Reviews, Apr. 10, 2017, doi: 10.1007/s11214-017-0359-3, 16 pgs.
Harlander et al., "Spatial heterodyne spectroscopy for the exploration of diffuse interstellar emission lines at far-ultraviolet wavelengths", The Astrophysical Journal, Sep. 10, 1992, vol. 396, pp. 730-740.
Harlander, "Spatial Heterodyne Spectroscopy: Interferometric Performance at any Wavelength Without Scanning", Thesis, University of Wisconsin-Madison, 1991, 193 pgs.
Harlander et al., "A Differential, Field-Widened Spatial Heterodyne Spectrometer for Investigations at High Spectral Resolution of the Diffuse Far Ultraviolet 1548 A Emission Line from the Interstellar Medium", SPIE vol. 2006, Nov. 19, 1993, pp. 139-148.
Harlander et al., "A High Resolution Broad Spectral Range Spatial Heterodyne Spectrometer for UV Laboratory Astrophysics", Optical Society of America, OSA Technical Digest Series, Fourier Transform Spectroscopy/Hyperspectral Imaging and Sounding of the Environment, Feb. 11-15, 2007, 3 pgs.

(56) References Cited

OTHER PUBLICATIONS

Harlander et al., "Design and Laboratory Tests of the Michelson Interferometer for Global High-resolution Thermospheric Imaging (MIGHTI) on the Ionospheric Connection Explorer (ICON) Satellite", Optical Society of America, Fourier Transform Spectroscopy, Mar. 1-4, 2015, 3 pgs.
Harlander et al., "Design of a real-fringe DASH interferometer for observations of thermospheric winds from a small satellite", Imaging and Applied Optics, Fourier Transform Spectroscopy, Jun. 23-24, 2013, 3 pgs.
Harlander et al., "Field-widened spatial heterodyne spectroscopy: correcting for optical defects and new vacuum ultraviolet performance tests", SPIE vol. 2280, Sep. 16, 1994, pp. 310-319.
Harlander et al., "First results from an all-reflection spatial heterodyne spectrometer with broad spectral coverage", Optics Express, Mar. 15, 2010, vol. 18, No. 6, pp. 6205-6210.
Harlander et al., "Michelson Interferometer for Global High-Resolution Thermospheric Imaging (MIGHTI): Monolithic Interferometer Design and Test", Space Science Reviews, Oct. 2017, vol. 212, No. 1-2, pp. 601-613, doi: 10.1007/s11214-017-0374-4.
Harlander et al., "Robust Monolithic Ultraviolet Interferometer for the SHIMMER Instrument on STPSat-1", Applied Optics, May 20, 2003, vol. 42, No. 15, pp. 2829-2834.
Harlander et al., "SHIMMER: a spatial heterodyne spectrometer for remote sensing of Earth's middle atmosphere", Applied Optics, Mar. 1, 2002, vol. 41, No. 7, pp. 1343-1352.
Harlander et al., "Sounding rocket payload designed for investigations of the distribution and dynamics of the hot component of the interstellar medium using a field-widened spatial heterodyne spectrometer", SPIE vol. 2518, Sep. 1, 1995, pp. 132-140.
Harlander et al., "Spatial heterodyne spectroscopy: a novel interferometric technique for ground-based and space astronomy", SPIE vol. 1235, Jul. 1, 1990, doi: 10.1117/12.19125, 13 pgs.
Harlander et al., "Spatial heterodyne spectroscopy: a novel interferometric technique for the FUV", SPIE vol. 1344 EUV, X-Ray, and Gamma-Ray Instrumentation for Astronomy, 1990, pp. 120-131.
Harlander et al., "Spatial Heterodyne Spectroscopy: For High Spectral Resolution Space-Based Remote Sensing", Optics & Photonics News, Jan. 2004. pp. 48-51.
Harlander et al., "Spatial heterodyne spectroscopy: laboratory tests of field-widened, multiple-order, and vacuum ultraviolet systems", SPIE vol. 1743, EUV, X-Ray, and Gamma-Ray Instrumentation for Astronomy III, Oct. 8, 1992, pp. 48-59.
Harris et al., "Applications of Reflective Spatial Heterodyne Spectroscopy to UV Exploration in the Solar System", Proceedings of SPIE, UV and Gamma-Ray Space Telescope Systems, Oct. 11, 2004, vol. 5488, pp. 886-897.
Harris et al., "Environmental testing of an all-reflective spatial heterodyne spectrometer for wide input angle measurements of H Ly-alpha at high spectral resolving power", Proc. of SPIE vol. 8443, Space Telescopes and Instrumentation 2012: Ultraviolet to Gamma Ray, Sep. 17, 2012, 8 pgs.
Harris, "Heterodyne spectrometers with very wide bandwidths", Proc. SPIE 4855, Millimeter and Submillimeter Detectors for Astronomy, Feb. 17, 2003, 11 pgs., doi: 10.1117/12.459150.
Harris et al., "A Broadband Spatial Heterodyne Spectrometer for High Resolution Studies of Faint Extended Emission Sources", Optical Society of America, Fourier Transform Spectroscopy/ Hyperspectral Imaging and Sounding of the Environment, Feb. 11-15, 2007, paper FThA6, 3 pgs.
Harris et al., "Applications of spatial heterodyne spectroscopy for remote sensing of diffuse UV-vis emission line sources in the solar system", Journal of Electron Spectroscopy and Related Phenomena, Mar. 14, 2005, vol. 144, pp. 973-977.
Harris et al., "Studies of H Ly-a emissions in the solar neighborhood with the techniques of polarimetry and spatial hetrodyne spectroscopy (SHS)", Proceedings of SPIE vol. 4854, Future EUV/UV and Visible Space Astrophysics Missions and Instrumentation, Feb. 24, 2003, pp. 676-685.

Hartogh et al., "Ocean-like water in the Jupiter-family comet 103P/Hartley 2", Nature, 2011, vol. 478, pp. 218-220.
Helg et al., "A high-resolution spatial heterodyning interference spectrometer", Optics and Lasers in Engineering, Jul. 27, 1998, vol. 30, pp. 409-420.
Helg et al., "A Novel High-resolution Interference Spectrometer", Optics and Lasers in Engineering, vol. 29, 1998, pp. 413-422.
Hicks et al., "Monolithic achromatic nulling interference coronagraph: design and performance", Applied Optics, Sep. 10, 2009, vol. 48, No. 26, pp. 4963-4977.
Hord et al., "Galileo Ultraviolet Spectrometer experiment", Space Science Reviews, 1992, vol. 60, pp. 503-530.
Hosseini, "Tunable Reflective Spatial Heterodyne Spectrometer: A Technique for High Resolving Power, Wide Field of View Observation of Diffuse Emission Line Sources", Thesis, University of California Davis, 2015, 123 pgs.
Hosseini et al., "Tunable spatial heterodyne spectroscopy (TSHS): a new technique for broadband visible interferometry", Proc. SPIE, Jul. 21, 2010, 7734(77343J), 12 pgs.
Hosseini et al., "First calibration and visible wavelength observations of Khayyam, a tunable spatial heterodyne spectroscopy (SHS)", Proc. SPIE 9147, Aug. 6, 2014, doi: 10.1117/12.2055862, 10 pgs.
Hosseini et al., "Khayyam: a second generation tunable spatial heterodyne spectrometer for observing diffuse emission line targets", Proc. SPIE 8446, Sep. 14, 2011, doi: 10.1117/12.900590, 12 pgs.
Hosseini et al., "Khayyam: a tunable spatial heterodyne spectrometer for observing diffuse emission line targets", Proc. of SPIE vol. 8446, Oct. 5, 2012, doi: 10.1117/12.925513, 12 pgs.
Hu et al., "Photochemistry in terrestrial exoplanet atmospheres. I. Photochemistry model and benchmark cases", The Astrophysical Journal, Dec. 20, 2012, vol. 761:166, 29 pgs.
Hu et al., "Raman spectroscopic detection for liquid and solid targets using a spatial heterodyne spectrometer", Journal of Raman Spectroscopy, Published Oct. 8, 2015, vol. 47, 2016, pp. 289-298.
Hu et al., "Raman spectroscopic detection using a two-dimensional spatial heterodyne spectrometer", Optical Engineering, Nov. 2015, vol. 54, No. 11, 114101-1-114101-9.
Ingleby et al., "Near-Ultraviolet Excess in Slowly Accreting T Tauri Stars: Limits Imposed By Chromospheric Emission", The Astrophysical Journal, Dec. 20, 2011, vol. 743:105, 11 pgs.
Jin et al., "Planetary population synthesis coupled with atmospheric escape: a statistical view of evaporation", The Astrophysical Journal, Sep. 9, 2014, 24 pgs.
John et al., "Optical Designing of Spatial Heterodyne Spectrometer using TracePro", International Journal of Advanced Research in Electrical, Electronics and Instrumentation Engineering, Apr. 2016, vol. 5, No. 4, DOI: 10.15662/IJAREEIE.2016.0504141, pp. 2911-2916.
Joyce, "An introduction to infrared detectors", NOAO Gemini Data Workshop, Jul. 19, 2010, 27 pgs.
Kim et al., "Resonance Raman and surface- and tip-enhanced Raman spectroscopy methods to study solid catalysts and heterogeneous catalytic reactions", Chemical Society Reviews, Oct. 19, 2010, 25 pgs., DOI: 10.1039/cOcs00044b.
Kislyakova et al., "Magnetic moment and plasma environment of HD 209458b as determined from Lya observations", Science, Nov. 21, 2014, vol. 346, No. 6212, pp. 981-984.
Kostiuk, "Heterodyne Spectroscopy in the Thermal Infrared Region: A Window on Physics and Chemistry", NASA Technical Reports Server, Feb. 1, 2004, 7 pgs.
Kreidberg et al., "Clouds in the atmosphere of the super-Earth exoplanet GJ1214b", Nature, Jan. 2, 2014, vol. 505, No. 7481, pp. 69-72.
Kulow et al., "Lya Transit Spectroscopy and the Neutral Hydrogen Tail of the Hot Neptune GJ 436b", The Astrophysical Journal, May 10, 2014, vol. 786: 132, 9 pgs.
Lacan et al., "A static Fourier transform spectrometer for atmospheric sounding: concept and experimental implementation", Optics Express, Apr. 12, 2010, vol. 18, No. 8, pp. 8311-8331.
Lafreniere et al., "HST/NICMOS detection of HR 8799 b IN 1998", The Astrophysical Journal, Apr. 1, 2009, vol. 694, pp. L148-L152.

(56) References Cited

OTHER PUBLICATIONS

Lamsal, "The Development of a High Resolution Deep-UV Spatial Heterodyne Raman Spectrometer", Thesis, University of South Carolina, 2016, 134 pgs.

Lamsal et al., "Deep-Ultraviolet Raman Measurements Using a Spatial Heterodyne Raman Spectrometer (SHRS)", Applied Spectroscopy, Feb. 19, 2015, vol. 69, No. 5, pp. 525-534.

Lamsal et al., "Performance Assessment of a Plate Beam Splitter for Deep-Ultraviolet Raman Measurements with a Spatial Heterodyne Raman Spectrometer", Applied Spectroscopy, Oct. 5, 2016, vol. 71, No. 6, 2017, pp. 1263-1270.

Lamsal et al., "Remote UV Raman Spectroscopy for Planetary Exploration Using a Miniature Spatial Heterodyne Raman Spectrometer", 47th Lunar and Planetary Science Conference, 2016, 2 pgs.

Lamsal et al., "Ultraviolet Stand-off Raman Measurements Using a Gated Spatial Heterodyne Raman Spectrometer", Applied Spectroscopy, Aug. 27, 2015, vol. 70, No. 4, 2016, pp. 666-675.

Lamsal et al., "Visible and UV Standoff Raman Measurements in Ambient Light Conditions Using a Gated Spatial Heterodyne Raman Spectrometer", 46th Lunar and Planetary Science Conference, 2015, 2 pgs.

Lanza, "On the correlation between stellar chromospheric flux and the surface gravity of close-in planets", Astronomy & Astrophysics, Nov. 4, 2014, vol. 572, L6, 5 pgs.

Lawler et al., "A broadband, high-resolution spatial heterodyne spectrometer", Physica Scripta, May 19, 2009, T134, 014016, 5 pgs.

Lawler et al., "A Spatial Heterodyne Spectrometer for Laboratory Astrophysics; First Interferogram", NASA Law, Feb. 14-16, 2006, UNLV, Las Vegas, 5 pgs.

Lawler et al., "Broadband, high-resolution spatial heterodyne spectrometer", Applied Optics, Dec. 1, 2008, vol. 47, No. 34, pp. 6371-6384.

Lawson, "Principles of long baseline stellar interferometry", JPL publication 00-009 07/00, Aug. 15-19, 1999, 352 pgs.

Learner et al., "Phase correction of emission line Fourier transform spectra", Journal of the Optical Society of America A, Oct. 1995, vol. 12, No. 10, pp. 2165-2171.

Lederer et al., "Chemical and physical properties of gas jets in comets I. Monte Carlo model of an inner cometary coma", Icarus, 2009, vol. 199: pp. 477-483.

Lenzner et al., "A Sagnac Fourier spectrometer", International Conference on Transparent Optical Networks, Jul. 2-6, 2017, 4 pgs.

International Preliminary Report on Patentability for International Application PCT/US2017/060473, Report dated May 7, 2019, dated May 16, 2019, 5 Pgs.

International Search Report and Written Opinion for International Application No. PCT/US2017/060473, Search dated Feb. 12, 2018, dated Feb. 13, 2018, 7 Pgs.

"A Monolithic, Non-Field-Widened Spatial Heterodyne Spectrometer for Solar System Exploration, Phase I Project", NASA, SBIR/STTR Programs, Space Technology Mission Directorate (STMD), Project Completed 2005, TechPort, Oct. 1, 2012, 3 pgs.

"A Practical Guide to Off-Axis Paraboloid Alignment Procedure", Optical Surfaces Limited, Dec. 27, 2018, Retrieved from: http://www.optisurf.com/pdf/Off-axis-Paraboloid-Alignment-Procedure-1.pdf, 8 pgs.

"Earth Science and Applications from Space: A Midterm Assessment of NASA's Implementation of the Decadal Survey", Committee on the Assessment of NASA's Earth Science Program; Space Studies Board; Division on Engineering and Physical Sciences; National Research Council, 2012, 124 pgs.

"Panel Reports—New Worlds, New Horizons in Astronomy and Astrophysics", Science Frontiers Panels; Program Prioritization Panels; Committee for a Decadal Survey of Astronomy and Astrophysics; National Research Council, 2010, 579 pgs. (presented in four parts).

"Science Payload", European Space Agency, Juice, Mar. 7, 2013, http://sci.esa.int/juice/50073-science-payload/, 3 pgs.

"Vision and Voyages for Planetary Science in the Decade 2013-2022", Committee on the Planetary Science Decadal Survey; Space Studies Board; Division on Engineering and Physical Sciences; National Research Council, 2011, 398 pgs., (presented in two parts).

"Vision and voyages for planetary science in the decade 2013-2022", The National Academy of Sciences, Space Studies Board, Mar. 2011, 2 pgs.

"ZERODUR: Zero Expansion Glass Ceramic", SCHOTT Advanced Optics, Jul. 14, 2011, Retrieved from: http://glassfab.com/wp-content/uploads/2015/08/schott_zerodur.pdf, 24 pgs.

A'Hearn et al., "Emission by OD in comets", The Astrophysical Journal, Oct. 15, 1985, vol. 297, pp. 826-836.

Adamovsky et al., "Detection, Evaluation, and Optimization of Optical Signals Generated by Fiber Optic Bragg Gratings Under Dynamic Excitations", NASA/TM-2002—211565, Aug. 2002, 17 pgs.

Adams et al., "High-resolution observations of the Lyman alpha sky background", The Astrophysical Journal, Feb. 15, 1977, vol. 212, pp. 300-308.

Alexander et al., "The provenances of asteroids, and their contributions to the volatile inventories of the terrestrial planets", Science, Aug. 10, 2012, vol. 337, pp. 721-723.

Altwegg et al., "67p/churyumov-gerasimenko, a Jupiter family comet with a high d/h ratio", Science, Jan. 23, 2015, vol. 347, No. 6220, 7 pgs.

Angel et al., "A Miniature Spatial Heterodyne UV Raman Spectrometer for Planetary Exploration: Proof of Principle for Smallsat Standoff Operations Using a Cell-Phone Detector", Lunar and Planetary Science XLVIII, 2017, 2 pgs.

Angel et al., "Standoff Detection using a Spatial Heterodyne Raman Spectrometer", Dept. of Chemistry & Biochemistry The University of South Carolina, Aug. 21, 2014, 29 pgs.

Banaszkiewicz et al., "Determination of interstellar helium parameters from the Ulysses-Neutral Gas experiment: Method of data analysis", Astronomy & Astrophysics Supplement Series, Apr. 24, 1996, vol. 120, pp. 587-602.

Barnett et al., "Improving Spectral Results Using Row-by-Row Fourier Transform of Spatial Heterodyne Raman Spectrometer Interferogram", Applied Spectroscopy, Oct. 21, 2016, vol. 71, No. 6, pp. 1380-1386, doi: 10.1177/0003702816681013.

Barnett et al., "Standoff Laser-Induced Breakdown Spectroscopy (LIBS) Using a Miniature Wide Field of View Spatial Heterodyne Spectrometer with Sub-Microsteradian Collection Optics", Applied Spectroscopy, Apr. 6, 2016, vol. 71, No. 4, 2017, pp. 583-590.

Barthelemy et al., "Sensitivity of upper atmospheric emissions calculations to solar/stellar UV flux", Journal of Space Weather and Space Climate, Oct. 20, 2014, vol. 4, A35, 8 pgs.

Beaty et al., "Candidate Scientific Objectives for the Human Exploration of Mars, and Implications for the Identification of Martian Exploration Zones", Scientific Objectives for the Human Exploration of Mars Science Analysis Group (MEPAG HSO-SAG), Jul. 24, 2015, 38 pgs.

Beauge et al., "Emerging Trends in a Period-Radius Distribution of Close-in Planets", The Astrophysical Journal, Jan. 20, 2013, vol. 763, 7 pgs.

Ben-Jaffel et al., "Transit of Exomoon Plasma Tori: New Diagnosis", The Astrophysical Journal, Apr. 3, 2014, 7 pgs.

Ben-Jaffel et al., "On the existence of energetic atoms in the upper atmosphere of exoplanet HD209458b", The Astrophysical Journal, Feb. 1, 2010, vol. 709, pp. 1284-1296.

Bershady, "3D Spectroscopic Instrumentation", arXiv:0910.0167, Oct. 1, 2009, 53 pgs.

Bertaux et al., "Characteristics of the Local Interstellar Hydrogen determined from PROGNOZ 5 and 6 interplanetary Lyman alpha line profile measurements with a hydrogen absorption cell", Astronomy & Astrophysics, Mar. 21, 1985, vol. 150, pp. 1-20.

Bertaux et al., "Evidence for a Source of an Extraterrestrial Hydrogen Lyman-alpha Emission: the Interstellar Wind", Astronomy & Astrophysics, 1971, vol. 11, pp. 200-217.

Bertaux et al., "Interstellar medium in the vicinity of the sun—A temperature measurement obtained with Mars-7 interplanetary probe", Astronomy & Astrophysics, 1976, vol. 46, pp. 19-29.

(56) References Cited

OTHER PUBLICATIONS

Bertaux et al., "Monitoring solar activity on the far side of the sun from sky reflected Lyman α radiation", Geophysical Research Letters, May 1, 2000, vol. 27, No. 9, pp. 1331-1334.
Bertin et al., "Detection of the local interstellar cloud from high-resolution spectroscopy of nearby stars: Inferences on the heliospheric interface", Journal of Geophysical Research, Sep. 1, 1993, vol. 98, No. A9, p. 15193-15197.
Betremieux et al., "Description and ray-tracing simulations of HYPE: a far-ultraviolet polarimetric spatial-heterodyne spectrometer", Proc. of SPIE, vol. 7732, Jul. 29, 2010, 12 pgs.
Bieler et al., "Abundant molecular oxygen in the coma of comet 67P/Churyumov-Gerasimenko", Nature, Oct. 29, 2015, vol. 526, pp. 678-681.
Bingham, "Grating spectrometers and spectrographs re-examined", Quarterly Journal of the Royal Astronomical Society, May 18, 1979, vol. 20, pp. 395-421.
Bishop et al., "Analysis of Balmer a intensity measurements near solar minimum", Journal of Atmospheric and Solar-Terrestrial Physics, Apr. 3, 2000, vol. 63, 2001, pp. 341-353.
Biver et al., "Chemical Composition Diversity Among 24 Comets Observed at Radio Wavelengths", Earth, Moon, and Planets, May 19, 2002, vol. 90, No. 1, pp. 323-333.
Blasberg et al., "Interference of Scattering Pathways in Raman Heterodyne Spectroscopy of Multilevel Atoms", Physical Review B, May 1, 1995, vol. 51, 12439, 1 pg.
Bockelee-Morvan et al., "The Composition of Cometary Volatiles", Comets II, 2005, pp. 391-423.
Bourrier et al., "Atmospheric escape from HD 189733b observed in HI Lyman-a: detailed analysis of HST/STIS Sep. 2011 observations", Astronomy and Astrophysics, Jan. 9, 2013, vol. 551: A63, 11 pgs.
Bourrier et al., "Radiative braking in the extended exosphere of GJ 436 b", Astronomy and Astrophysics, Aug. 20, 2015, vol. 582, 9 pgs.
Brandt et al., "Interplanetary Gas. I. Hydrogen Radiation in the Night Sky", The Astrophysical Journal, 1959. vol. 130, pp. 670-682.
Breckinridge, "Coherence interferometer and astronomical applications", Applied Optics, Dec. 1972, vol. 11, pp. 2996-2998.
Broadfoot et al., "Self-scanned anode array with a microchannel plate electron multiplier—The SSANACON", Applied Optics, Jun. 1977, vol. 16, No. 6, pp. 1533-1538.
Broadfoot et al., "The interstellar wind—Mariner 10 measurements of hydrogen (1216 A) and helium (584 A) interplanetary emission", The Astrophysical Journal, Jun. 15, 1978, vol. 222, pp. 1054-1067.
Burrows, "Highlights in the study of exoplanet atmospheres", Nature, Sep. 18, 2014, vol. 513, pp. 345-352.
Burrows et al., "Astronomical questions of origins and survival", Nature, Nov. 23, 1995, vol. 378, p. 333.
Cai et al., "Optical simulation of large aperture spatial heterodyne imaging spectrometer", Optics Communications, Available online Dec. 28, 2015, vol. 366, 2016, pp. 136-141.
Calvet et al., "The Structure and Emission of the Accretion Shock in T Tauri Stars", The Astrophysical Journal, Dec. 20, 1998. vol. 509, pp. 802-818.
Chakrabarti et al., "Self-compensating, all-reflection interferometer", Applied Optics, May 1, 1994, vol. 33, No. 13, pp. 2596-2607.

Charbonneau et al., "Detection of an Extrasolar Planet Atmosphere", The Astrophysical Journal, Nov. 19, 2001, vol. 568, No. 1, 26 pgs.
Chassefiere et al., "Atomic hydrogen and helium densities of the interstellar medium measured in the vicinity of the sun", Astronomy & Astrophysics, 1986, vol. 160, pp. 229-242.
Combi et al., "Hubble Space Telescope Ultraviolet imaging and high-resolution spectroscopy of water photodissociation products in Comet Hyakutake (C/1996 B2)", The Astrophysical Journal, Feb. 20, 1998, vol. 494, pp. 816-821.
Combi et al., "SOHO/SWAN Observations of the Structure and Evolution of the Hydrogen Lyman a Coma of Comet Hale-Bopp (1995 O1)", Icarus, 2000, vol. 144, pp. 191-202.
Corliss et al., "Development and Field Tests of a Narrowband All-Reflective Spatial Heterodyne Spectrometer", Applied Optics, Oct. 20, 2015, vol. 54, No. 3 0, pp. 8835-8843.
Damiani et al., "An Imaging Heterodyne Spectometer for Planetary Exploration", Optical Society of America, OSA Technical Digest Series, Fourier Transform Spectroscopy/Hyperspectral Imaging and Sounding of the Environment, Feb. 11-15, 2007, 3 pgs.
Dawson et al., "Tunable, All-Reflective Spatial Heterodyne Spectrometer for Broadband Spectral Line Studies in the Visible and Near-Ultraviolet", Applied Optics, Jul. 20, 2009, vol. 48, No. 21, pp. 4227-4238.
Dohi et al., "Attainment of High Resolution Holographic Fourier Transform Spectroscopy", Applied Optics, May 1971, vol. 10, No. 5, pp. 1137-1140.
Dohlen, "Design of an Interferometric Spectrometer for Environmental Surveillance", Thesis, University of London, Oct. 16, 1993, 217 pgs.
Dubessy et al., "Instrumentation in Raman Spectroscopy: Elementary Theory", Universite de Lorraine, GeoResources, 2016, VIII International Siberian Early Career GeoScientists Conference, 38 pgs.
Ehrenreich et al., "A giant comet-like cloud of hydrogen escaping the warm Neptune-mass exoplanet GJ 436b", Nature, Jun. 25, 2015, vol. 522, No. 7557, pp. 459-461.
Englert et al., "High sensitivity trace gas sensor for planetary atmospheres: miniaturized Mars methane monitor", Journal of Applied Remote Sensing, 2014, vol. 8, pp. 083625-1-083625-15.
Englert et al., "Initial ground-based thermospheric wind measurements using Doppler asymmetric spatial heterodyne spectroscopy (DASH)", Optics Express, Dec. 20, 2010, vol. 18, No. 26, pp. 27416-27430.
Englert et al., "Spatial Heterodyne Imager for Mesospheric Radicals on STPSat-1", Journal of Geophysical Research-Atmospheres, Oct. 22, 2010. vol. 115, D20306, 20 pgs.
Englert et al., "Spatial heterodyne spectroscopy for long-wave infrared: first measurements of broadband spectra", Optical Engineering, Oct. 30, 2009, vol. 48, No. 10, p. 105602-1-105602-9.
Englert et al., "The Michelson Interferometer for Global High-resolution Thermospheric Imaging (MIGHTI): Wind and Temperature Observations from the Ionospheric Connection Explorer (ICON)", Imaging and Applied Optics, OSA Technical Digest, Optical Society of America, 2013, paper FW1D.3, 3 pgs., https://doi.org/10.1364/FTS.2013.FW1D.3.
Englert et al., "Correction of phase distortion in spatial heterodyne spectroscopy", Applied Optics, Dec. 20, 2004, vol. 43, No. 36, pp. 6680-6687.

\* cited by examiner

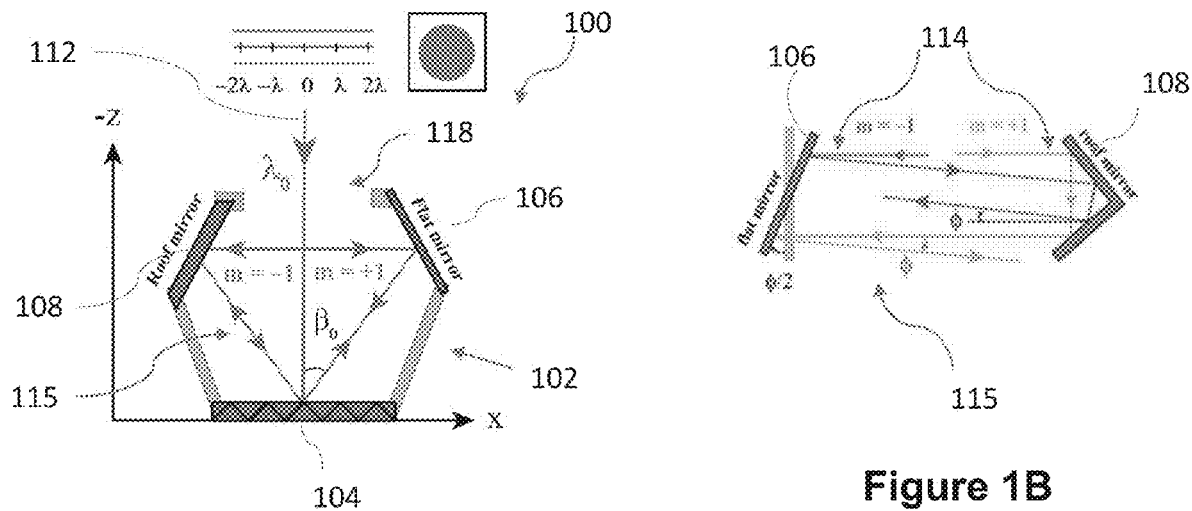
Figure 1A
Figure 1B
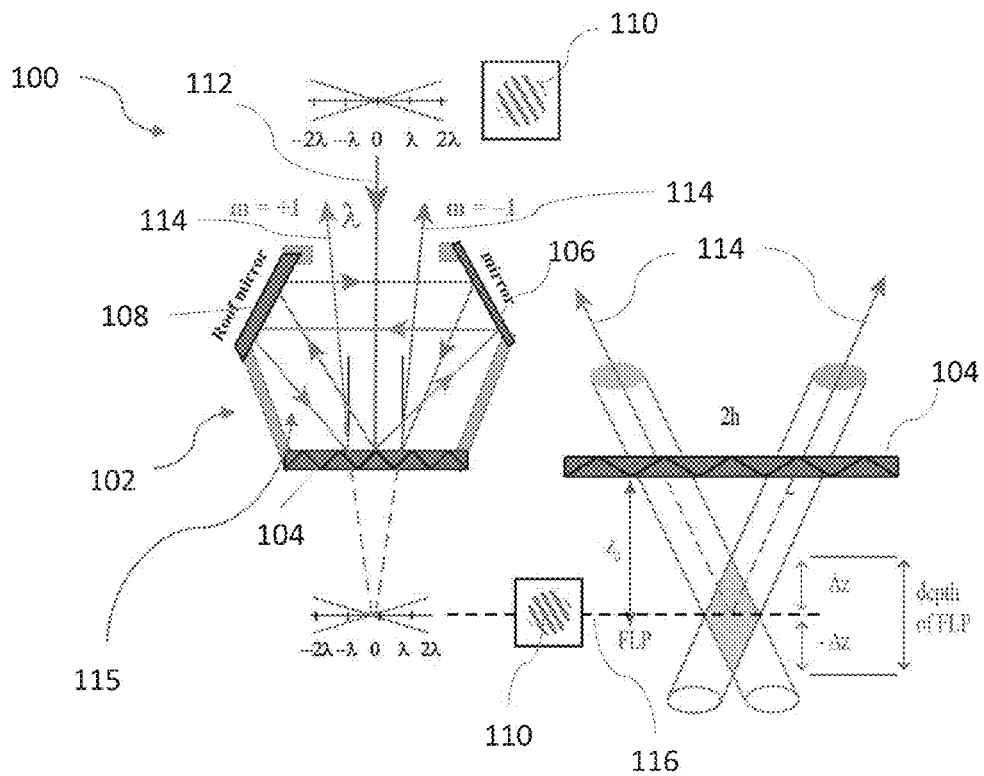
Figure 1C

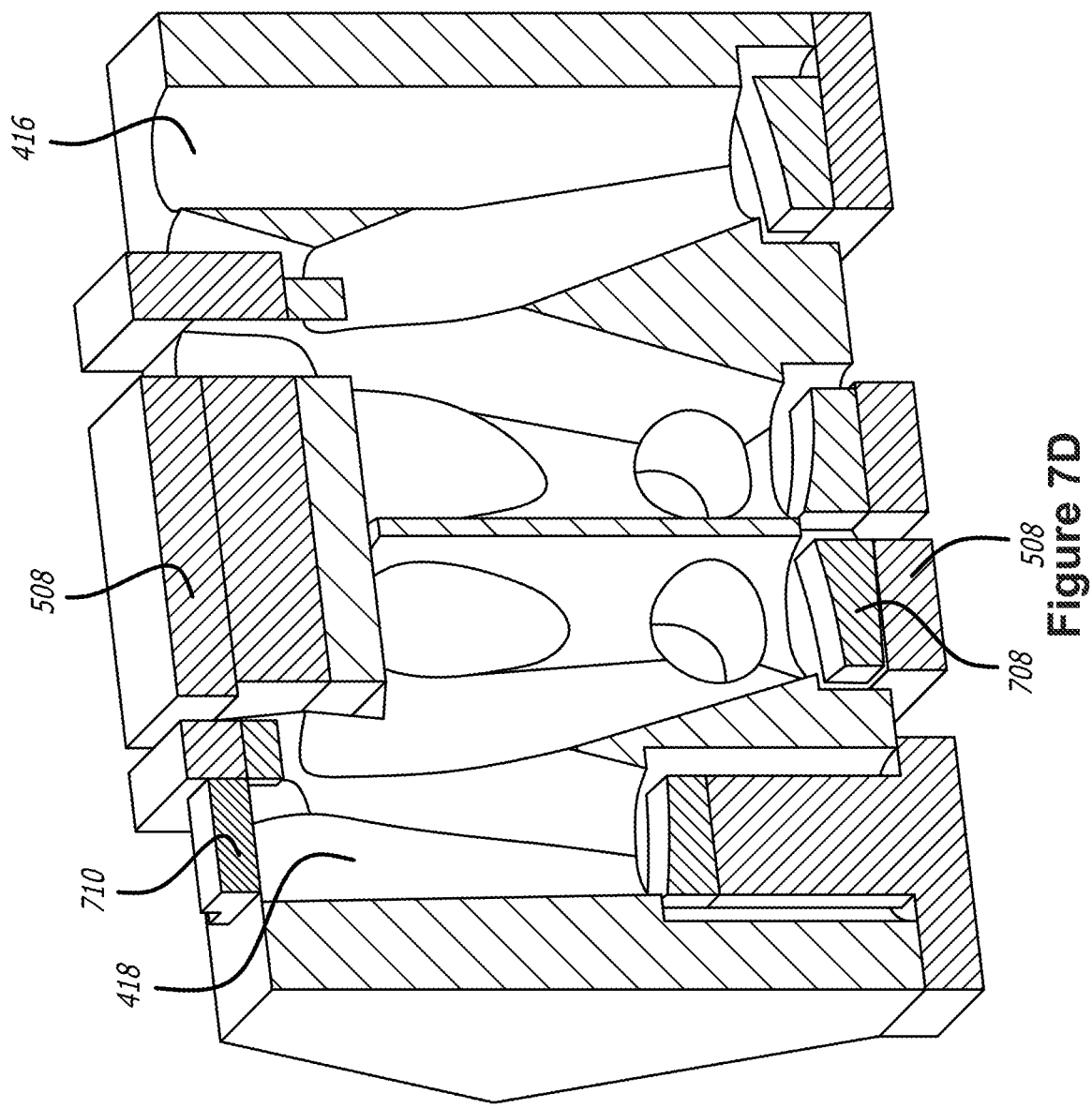

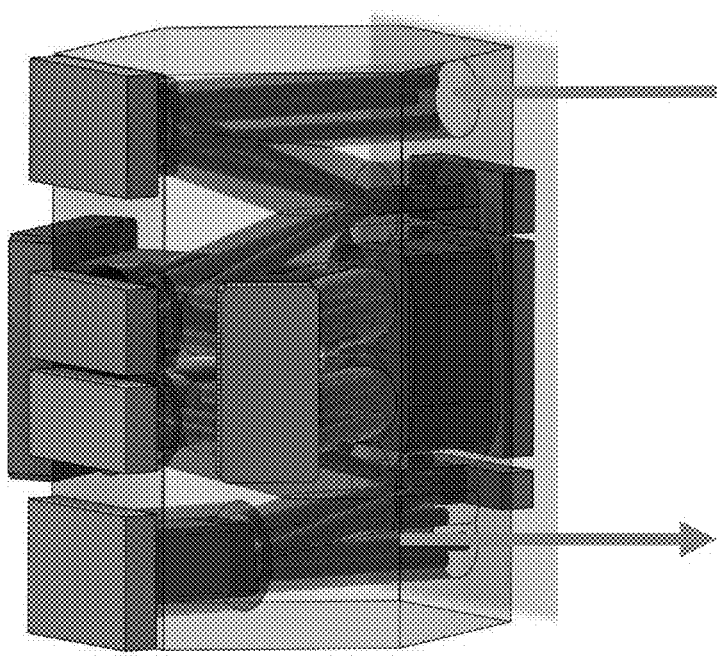

MONOLITHIC ASSEMBLY OF MINIATURE REFLECTIVE CYCLICAL SPATIAL HETERODYNE SPECTROMETER INTERFEROMETRY SYSTEMS

CROSS-REFERENCE TO RELATED APPLICATIONS

The current application claims priority to U.S. Provisional Patent Application No. 63/122,144, entitled "Monolithic System Assembly of Miniature Reflective Spatial Heterodyne Spectrometer" by Seyedeh Sona Hosseini, filed Dec. 7, 2020; the disclosure of which is hereby incorporated by reference in its entirety.

STATEMENT REGARDING FEDERALLY SPONSORED RESEARCH OR DEVELOPMENT

This invention was made with government support under Grant No. 80NMO0018D0004 awarded by NASA (JPL). The government has certain rights in the invention.

FIELD OF THE INVENTION

The present disclosure is directed to interference spectrometers; and more particularly to monolithic assemblies that include reflective spatial heterodyne spectrometers.

BACKGROUND

Observing the intensity and line profile of emission and absorption lines is a stable technique for a widespread variety of applications, such as the study of astronomical targets. Atomic, molecular, and ion transitions in emission or absorption spectra reveal important information about composition, isotopic ratios, temperature, velocity and the amount of energy entering or leaving a system. Low-resolution spectroscopy allows the study of basic parameters like composition, distribution, intensity, and energy distribution. In contrast, high-resolution spectroscopy can reveal additional information about the physical characteristics of a source such as velocity, temperature, pressure, isotopic signatures, etc.

There is an increased interest in spectroscopy, such as passive remote sensing for purposes, and commonly used high spectral resolution spectrometers that are currently used for such applications are diffraction grating spectrometry and Fourier transform spectroscopy (FTS). Spatial heterodyne spectrometers (SHSs) instruments have the superior performance model of FTS instruments with the advantage of being smaller, no moving parts, and simple, more robust, optomechanical design. However, one of the weaknesses of reflective SHS instruments is the size of the and assembly structure of the system: the performance of the interferometer has tight tolerances, so holders for various input and output optical components (e.g., mirrors, gratings, etc.) can be aligned after assembly. The holding fixtures have to be very firm and inflexible during thermal variations and environmental vibration, which complicates the mounting design. If such mounts are not optimized for stiffness, an interferometer system is even more sensitive to vibration. Additionally, the weight of such interferometers is driven by the optical components and construction material (e.g., steel, aluminum, invar) of the mounting fixtures. Currently, no system exists that allows for miniaturization of entire interferometry systems that includes all the components other than the interferometer module, while maintaining optical tolerances.

SUMMARY OF THE INVENTION

This summary is meant to provide some examples and is not intended to be limiting of the scope of the invention in any way. For example, any feature included in an example of this summary is not required by the claims, unless the claims explicitly recite the features. Various features and steps as described elsewhere in this disclosure may be included in the examples summarized here, and the features and steps described here and elsewhere can be combined in a variety of ways.

In one embodiment, a monolithic reflective spatial heterodyne spectrometer (SHS) interferometer system includes a monolithic supporting structure formed from a single piece of a single material forming a body with a plurality of planar faces and a plurality of channels, where the plurality of channels forms an optical path from an incoming light opening to an outgoing light opening, reflective SHS core optics including a symmetric grating, a flat mirror, and a roof mirror, where the symmetric grating is affixed to a face of the monolithic supporting structure such that the symmetric grating splits an incoming light into two diffracted beams traveling in different, angularly offset directions, where the flat mirror is affixed to a face of the monolithic supporting structure at a first angle in relation to the symmetric grating, where the roof mirror is affixed to a face of the monolithic supporting structure at a second angle in relation to the symmetric grating, and where the flat mirror and the roof mirror are disposed such that the flat mirror and the roof mirror reflect the diffracted beams in a cyclical common-path configuration such that the diffracted beams diffract again off the symmetric grating to produce a localized fringe pattern, incoming light optics affixed to a face of the monolithic supporting structure, where the incoming light optics redirect the light entering the incoming light opening through the optical path formed by the plurality of channels to the SHS core optics, and outgoing light optics affixed to a face of the monolithic supporting structure, where the outgoing light optics redirect the light exiting the SHS core optics through the optical path formed by the plurality of channels to the outgoing light opening.

In a further embodiment, the faces of the monolithic supporting structure are aligned to generate a heterodyne condition in the SHS core optics for one wavelength, the heterodyne condition being satisfied when there exists a heterodyne wavelength $\lambda_0$ where the two diffracted beams exit the reflective spatial heterodyne spectrometer in normal angle and do not produce a localized fringe pattern.

In another embodiment, the roof mirror and the flat mirror are separated by a distance of no more than 70 mm.

In a still further embodiment, the roof mirror and the flat mirror are separated by a distance of no more than 25 mm.

In still another embodiment, the monolithic supporting structure has a linear length of approximately 30 mm.

In a yet further embodiment, the SHS system has a mass of approximately 400 g.

In yet another embodiment, the SHS system has a mass of approximately 50 g.

In a further embodiment again, the monolithic supporting structure is made of glass, ceramic, sapphire, zinc sulfide, a single-crystalline material, a polycrystalline material, a plastic, a metal, or a metal alloy.

In another embodiment again, the monolithic supporting structure is made of fused silica glass, BK7 glass, ZERODUR®, or CLEARCERAM®.

In a further additional embodiment, the monolithic supporting structure is made of titanium, aluminum, stainless steel, or copper.

In another additional embodiment, the input optics include at least one off-axis parabolic mirror.

In a still yet further embodiment, the output optics include at least one off-axis parabolic mirror.

In still yet another embodiment, the apparatus further includes a sensor to record the localized fringe pattern, where the sensor is affixed to a face of the monolithic supporting structure such that light exiting the outgoing light opening intercepts the sensor.

In a still further embodiment again, the sensor is selected from the group consisting of: a 1D array detector, a 2D array detector, a photomultiplier tube, and a diode.

In still another embodiment again, the SHS core optics, the incoming optics, the outgoing optics, and the monolithic supporting structure are made of the same material.

In a still further additional embodiment, the apparatus further includes a frame block affixed to a face of the monolithic supporting structure, where at least one of the input optics, the output optics, the flat mirror, the roof mirror, and the symmetric grating is affixed to the frame block.

In still another additional embodiment, the symmetric grating, the flat mirror, and the roof mirror are affixed via an adhesive or via optical bonding.

In a yet further embodiment again, the apparatus further includes a second plurality of channels, where the second plurality of channels forms a second optical path from a second incoming light opening to a second outgoing light opening, a second reflective SHS core optics including a second symmetric grating, a second flat mirror, and a second roof mirror, where the second symmetric grating is affixed to a face of the monolithic supporting structure such that the second symmetric grating splits an incoming light into two diffracted beams traveling in different, angularly offset directions, where the second flat mirror is affixed to a face of the monolithic supporting structure at a first angle in relation to the second symmetric grating, where the second roof mirror is affixed to a face of the monolithic supporting structure at a second angle in relation to the second symmetric grating, and where the second flat mirror and the second roof mirror are disposed such that the second flat mirror and the second roof mirror reflect the diffracted beams in a cyclical common-path configuration such that the diffracted beams diffract again off the second symmetric grating to produce a localized fringe pattern, a second incoming light optics affixed to a face of the monolithic supporting structure, where the second incoming light optics redirect the light entering the second incoming light opening through the optical path formed by the second plurality of channels to the second SHS core optics, and a second outgoing light optics affixed to a face of the monolithic supporting structure, where the second outgoing light optics redirect the light exiting the second SHS core optics through the optical path formed by the second plurality of channels to the second outgoing light opening.

In yet another embodiment again, a monolithic reflective spatial heterodyne spectrometer (SHS) interferometer system includes a monolithic supporting structure formed from a single piece of a single material forming a body with a plurality of planar faces and a plurality of channels, where the plurality of channels forms an optical path from an incoming light opening to an outgoing light opening, reflective SHS core optics including a symmetric grating, a flat mirror, and a roof mirror, where the symmetric grating is affixed to a face of the monolithic supporting structure such that the symmetric grating splits an incoming light into two diffracted beams traveling in different, angularly offset directions, where the flat mirror is affixed to a face of the monolithic supporting structure at a first angle in relation to the symmetric grating, where the roof mirror is affixed to a face of the monolithic supporting structure at a second angle in relation to the symmetric grating, and where the flat mirror and the roof mirror are disposed such that the flat mirror and the roof mirror reflect the diffracted beams in a cyclical common-path configuration such that the diffracted beams diffract again off the symmetric grating to produce a localized fringe pattern, and incoming light optics affixed to a face of the monolithic supporting structure, where the incoming light optics redirect the light entering the incoming light opening through the optical path formed by the plurality of channels to the SHS core optics.

In a yet further additional embodiment, a monolithic reflective spatial heterodyne spectrometer (SHS) interferometer system includes a monolithic supporting structure formed from a single piece of a single material forming a body with a plurality of planar faces and a plurality of channels, where the plurality of channels forms an optical path from an incoming light opening to an outgoing light opening, reflective SHS core optics including a symmetric grating, a flat mirror, and a roof mirror, where the symmetric grating is affixed to a face of the monolithic supporting structure such that the symmetric grating splits an incoming light into two diffracted beams traveling in different, angularly offset directions, where the flat mirror is affixed to a face of the monolithic supporting structure at a first angle in relation to the symmetric grating, where the roof mirror is affixed to a face of the monolithic supporting structure at a second angle in relation to the symmetric grating, and where the flat mirror and the roof mirror are disposed such that the flat mirror and the roof mirror reflect the diffracted beams in a cyclical common-path configuration such that the diffracted beams diffract again off the symmetric grating to produce a localized fringe pattern, and outgoing light optics affixed to a face of the monolithic supporting structure, where the outgoing light optics redirect the light exiting the SHS core optics through the optical path formed by the plurality of channels to the outgoing light opening.

Other features and advantages of the present invention will become apparent from the following detailed description, taken in conjunction with the accompanying drawings which illustrate, by way of example, the principles of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIGS. 1A-1C provide schematic diagrams of a reflective SHS configuration. FIG. 1A shows the beam path at the heterodyne wavelength (no fringe pattern), and FIG. 1B provides a top view of the beam path schematic. FIG. 1C shows the beam path at other wavelengths, further showing the fringe localization plane in relation to the symmetric grating and diffraction beams in addition to the fringe pattern that is produced.

FIG. 7D illustrates an open view of a monolithic reflective SHS interferometer system along with a sensor or detector in accordance with various embodiments of the invention.

FIGS. 9A-9C illustrate a process for calibrating a reflective SHS interferometer system in accordance with various embodiments of the invention.

DETAILED DESCRIPTION

Figure 2:
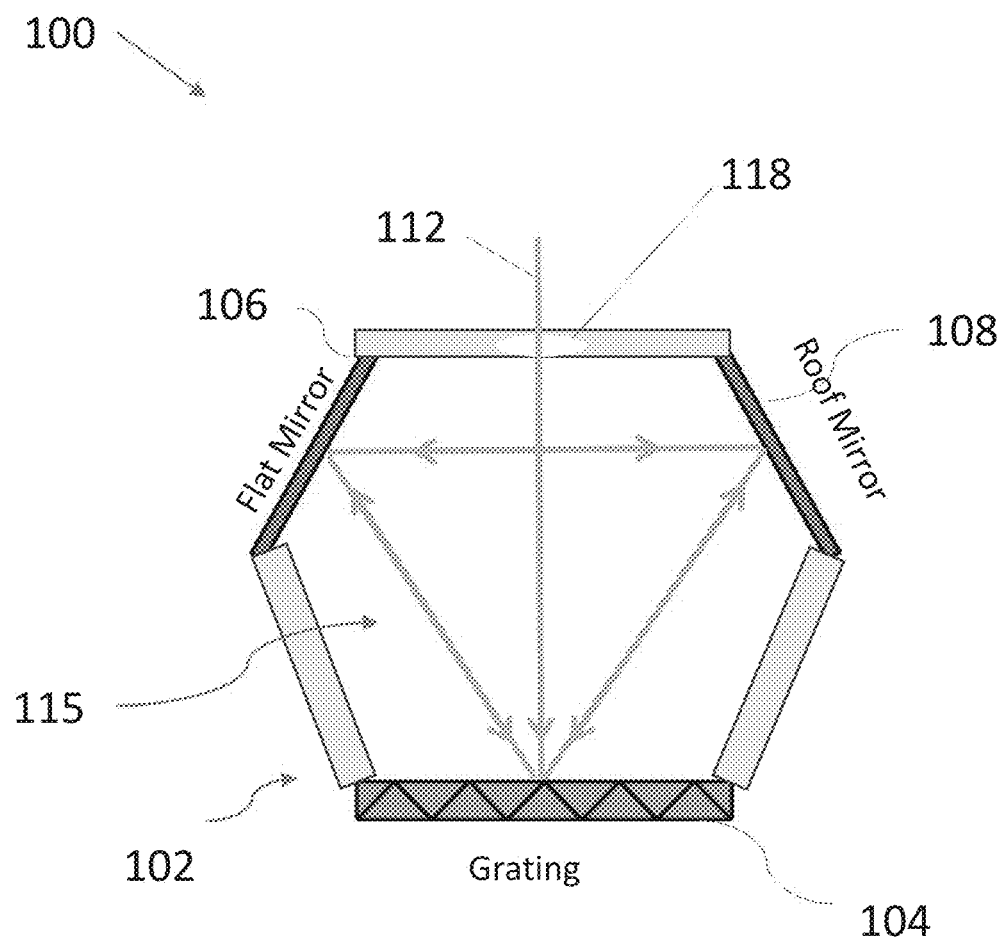
FIG. 2 provides another schematic diagram of a reflective SHS configuration in accordance with some embodiments of the current invention, where the supporting structure has an opening disposed such that the incoming beam of light enters through the opening and hits the symmetric grating at normal incidence.

Turning now to the drawings, monolithic spatial heterodyne spectroscopy (SHS) interferometers and methods of their manufacture are provided. In many embodiments, the assembly structure (or housing) that forms the body of the interferometer is a single piece of a single piece of a single material. In numerous embodiments, the optical elements and/or components (e.g., input optics, output optics, SHS core module) are affixed directly to the assembly structure. Such embodiments provide robust interferometers, which are less susceptible to damage, aberration, and/or stresses caused by movement, transportation, thermal expansion/contraction, and/or other mechanical stresses on such devices. Further embodiments allow for miniaturization and scalability in the construction of SHS interferometers due to simplified production, assembly, and alignment of reflective SHS interferometers. Due to the scalability and range of effectiveness, many embodiments allow for quick and cost effective deployment in a variety uses, including astronomy (e.g., Earth and planetary observations from space- and ground-based observatories), medical (e.g., heath diagnostics and imaging), food safety (e.g., bacterial growth on food and as monitoring in packages and warehouses, shelf lifetime), intelligence gathering (e.g., exhaust fume monitoring), and tactical battlefield applications (e.g., chemical threat identification).

Technical Concept for SHS Interferometry

Spatial heterodyne spectrometers (SHSs) are compact two-beam interferometer in which the input spectrum can be obtained via a Fourier transform. With its high optical throughput (étendue) and wide field of view (FOV), many embodiments of SHSs have high sensitivity to weak or diffuse sources such as comet coma and atmospheric gases (e.g., on Earth, Mars, or other planetary bodies). There are two major designs based on SHS technology: a Michelson design and a reflective cyclical design. The Michelson design SHS (MSHS) is obtained by replacing the mirrors in each arm with gratings in a Michelson interferometer. A 2D array imaging detector, such as a CCD detector, images the fringes. The MSHS design eventually led to a series of ground and space-based instruments for observations of atmospheric and interstellar emission line features, and the majority of SHS projects and analysis in the known art are still in the MSHS format. A weakness of MSHS instruments is their non-common path design for the two arms and the use of transmitting elements, which limits their usefulness in shorter wavelengths (such as UV) and high temperature variation and high vibration environments.

A reflective cyclical SHS (RCSHS) is an all-reflective two-beam cyclical interferometer that can observe targeted atomic and molecular gas spectral lines at high spectral resolution. It comprises a grating and reflective optics (e.g., a flat mirror and a roof mirror) tailored to a target wavelength region (UV to IR). In certain embodiments, a reflective cyclical SHS includes a solid-state 2D array imaging detector that records optical interference fringes (wavenumber-dependent 2-D Fizeau fringe patterns), whose Fourier transform produces high-resolution spectra.

In many embodiments of reflective cyclical SHSs, an incoming light beam hits a grating in the normal incidence and splits to two diffraction orders (m=±1). In such embodiments, both diffraction orders traverse the optical path anti-symmetrically, converge on the grating, and diffract a second time before exiting the system. In many embodiments, the optical components are aligned such that the tuned wavelength, referred to as a heterodyne wavelength, have wave-fronts exit parallel to each other such that no fringes are created. Such a configuration introduces a dispersive rotation to merging wave-fronts of all other wavelengths, resulting in formation of a two-dimensional (2D) fringe pattern that is frequency dependent. A power spectrum can be obtained via a Fourier Transform of the 2D fringe pattern.

FIGS. 1-2 illustrate exemplary schematics of reflective cyclical SHSs in accordance with various embodiments. In such embodiments, the grating 104 itself diffracts an incoming collimated beam 112 into ±m orders following the grating equation for normal incidence [sin $\beta_{in}$+sin $\beta_{out}$]cos $\Phi$=m$\lambda$G where $\lambda$ is the wavelength, $\beta_{in}$ and $\beta_{out}$ are the incoming and outgoing angles, $\phi$ is the angle between the incoming beams relative to the grating normal perpendicular to the diffraction plane, and G is the groove density. The incoming light beam 112 hits the grating 104 in the normal incidence and splits to two anti-symmetrical diffraction orders (m=±1) 114. Both orders traverse the optical path 115 with opposite angular alignment, converge back on the grating 104, and diffract for the second time before exiting the system. By using a right angle 'roof' mirror 108 for one of the mirrors, the incoming and outgoing beams are separated into parallel planes below (or above) the incoming optical path. For the tuned wavelength $\lambda_o$, called the heterodyne wavelength, the optics are aligned in such a way to have both orders 114 exit the grating 104 in normal angle:

their wave-fronts exit parallel in respect to each other and hence create no fringes, as illustrated in FIG. 1A. This case is referred to as the 'heterodyne condition'. At all other wavelengths ($\lambda=\lambda_0\pm\Delta\lambda$), there is a dispersive rotation introduced to the merging wave-fronts that results in the formation of 2-D Fizeau fringes 110 (as illustrated in FIG. 1C) with a frequency dependent on $\Delta\lambda$. FIG. 1B provides a top view of the beam path and the parallel planes.

As illustrated in FIG. 1C, the data fringe pattern 110 forms at a location called the Fringe Localization Plane (FLP) 116 and is imaged onto a 2-D imaging detector. FLP 116 is defined by following the diverging exiting beams 114 from the interferometer (monolithic RCSHS 100) and is a virtual plane located at distance $z_0$ behind the grating 104 on the z-axis. The FLP 116 is where the imaging detector presumes the exiting beams 114 are intersecting, and the depth of FLP focus is the distance that the imaging detector can image while maintaining an acceptable fringe contrast.

In the small angle approximation, the FLP 116 position can be estimated as:

$$z_0 \approx \frac{L}{2\cos^2\beta_0}$$

where L is the average optical path inside the CRSHS and $\beta_0$ (shown in FIG. 1A) is the first diffraction angle for the heterodyne wavelength (to which the CRSHS is tuned). In the small angle approximation, the recorded interference pattern on the detector at wavelength $\sigma=1/\lambda$ from the two $m=\pm 1$ orders is defined as:

$$I(x, y, z_0, \sigma) = \int_{\sigma_1}^{\sigma} I(\sigma)d\sigma[1 + \cos(2\pi(f_x x + f_y y + f_z z_0))]$$

$$f_x \approx -4\delta\sigma \sin\beta_0$$

$$f_y \approx 2\sigma\phi$$

$$f_z \approx 2\sigma\sqrt{1 - 4\sin\beta_0^2(\delta\sigma/\sigma)^2}$$

Where $I(\sigma)$ is the spectral intensity of the input light, $\phi$ is the cross angle between the interferometer mirror and the diffraction plane, and $\sigma$ defines the bandpass boundary. The two-dimensional Fourier transform of $I(x, y, z_0, \sigma)$ recovers the original power spectrum in units of $\Delta\lambda$. Alignment of CRSHS involves the rotation of one or both of the transfer mirrors (106 and 108) to set the angles such that a chosen wavelength satisfies the heterodyne condition ($\lambda_0$).

High-resolution spectrometers are mainly grating spectrometers with small field of view in which the sensitivity and the spectral resolution drop with increasing of the slit size. Grating spectrometers require coupling to large aperture telescopes with competitive and limited allocation time, which limits their dedication to temporal observations of extended targets such as in comets, planetary atmospheres and large galaxy structures. Because RCSHS can be built in a significantly smaller volume than classical grating spectrometers and do not need large aperture telescopes to operate, they can provide a modern, less expensive, compact and accessible method for high-resolution wide field of view (FOV) studies of extended sources from ground and space platforms such as CubeSats and SmallSats.

Figure 3:
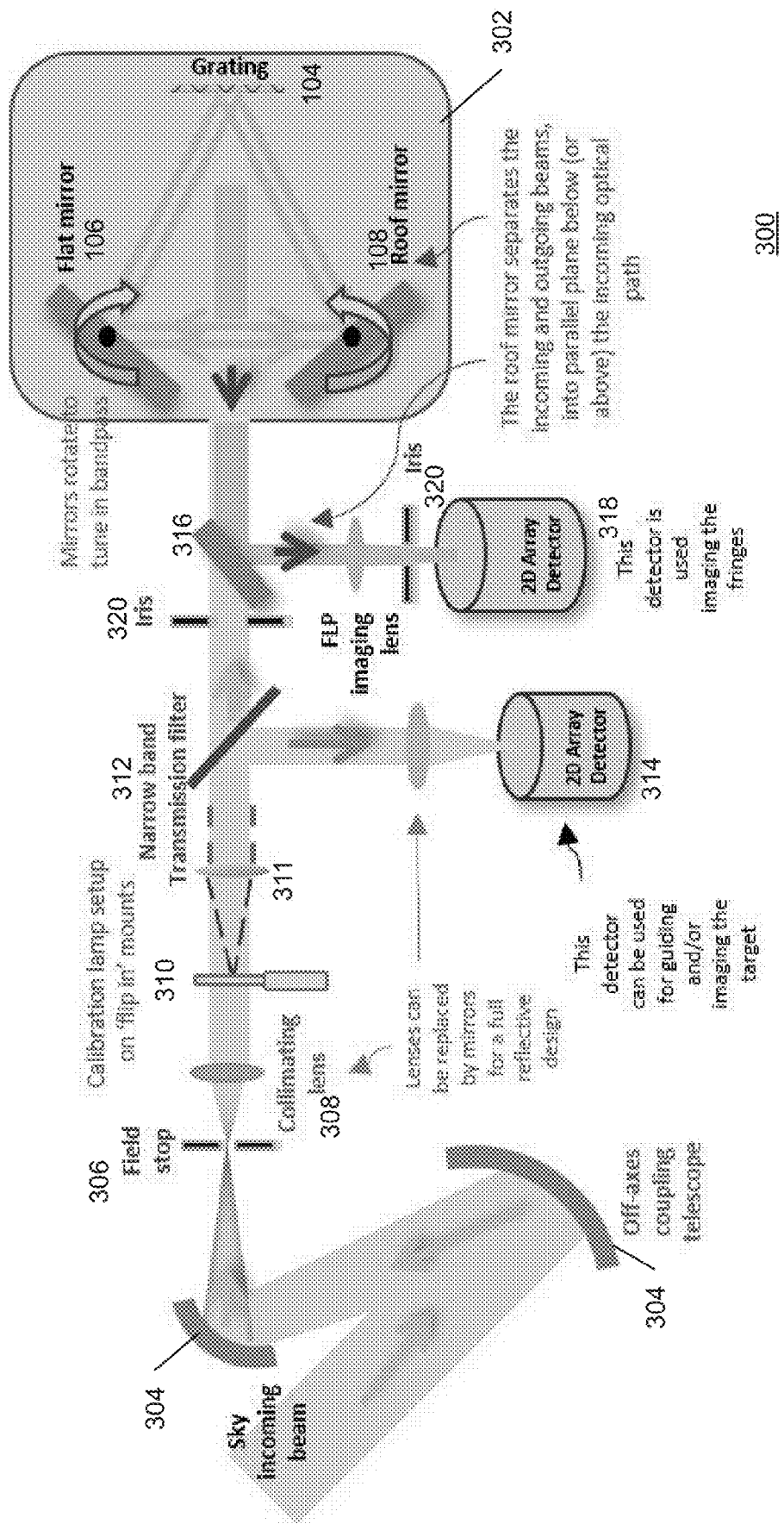
FIG. 3 provides a schematic of traditional reflective SHS interferometer systems in accordance with various embodiments of the invention.

FIG. 3 illustrates an exemplary schematic of an interferometer system 300 utilizing a reflective SHS core 302 in accordance with many embodiments. As illustrated, the reflective SHS includes a flat mirror 106, roof mirror 108, and a symmetric grating 104. In such systems, an incoming beam of light intercepts various optical components or elements, such as mirrors or lenses 304 (such as from a telescope) to focus light into an interferometer system 300. Additional embodiments include one or more of a field stop 306 and collimating lens 308 to select for specific axes of light and to collimate light, respectively. Some embodiments include an alignment and calibration lamp 310, which can be mounted on "flip-in" mounts and/or include a collimating lens 311 to collimate the alignment and calibration light. Additional embodiments include a narrow band filter 312, which can redirect some light to a detector 314 to guide and/or image the target of the interferometer system 300. Light transmitted through the narrow band filter 312 can intercept a one-way mirror 316, such that light incoming to the reflective SHS core 302 is transmitted through the one-way mirror 316, while outgoing light from the reflective SHS core 302 is deflected to a detector 318. Some embodiments include one or more of irises 320, which are capable of preventing or limiting light from transmitting further through the system.

In traditional interferometer systems, flat mirror 106 and roof mirror 108 can be rotated to tune in a specific bandpass. However, such systems require additional mechanical parts, fixtures, and mountings. Additionally, traditional interferometer systems typically occupy 2-3 feet in linear length (e.g., from input to reflective SHS). The overall size and complexity of such systems can introduce error from vibration, thermal expansion, and/or other possible physical error. In contrast, embodiments described herein provide a monolithic design that removes sources of such error by having a unitary body (e.g., a single body with no joints) which houses all components, such as detectors, mirrors, lenses, etc. In many of these embodiments, the unitary body provides the alignment for the components by having mounting faces that are aligned, thus the components can be mounted (e.g., via an adhesive and/or optical bond) without additional steps to specifically align any component.

Additional details describing RCSHS devices, such as field widened and fiber coupled reflective SHS systems are described in U.S. patent application Ser. No. 15/806,305 (published as US 2018/0128683), which is incorporated herein by reference in its entirety.

Embodiments of a Monolithic Assembly

Many embodiments are directed to a monolithic reflective SHS interferometer system, which offer many important benefits, such as a significant reduction in size and weight, simpler maintenance, and reduced manufacturing and maintenance costs (especially important for commercial applications). As noted above, with more moving parts, greater attention is required for stress, wear, galling, fatigue, etc. between each interface, and analysis of the instrument can be more difficult. More parts in the design means more parts to be manufactured while still meeting tight tolerance limits, and manufacturing difficulty, cost, mass, volume, and time can become significant issues. Maintenance is also not to be taken lightly, as complicated designs usually call for someone with higher expertise and training (also leading to increased expenses) and can result in extra time needed and more possibilities for error. This disclosure presents embodiments of novel monolithic RCSHS interferometer designs that can overcome the shortcomings of conventional setups while offering the benefits associated with having a monolithic assembly. Some embodiments of the invention significantly simplify the production, assembly, and alignment of RCSHS instruments, offering a faster, more flexible, and cost-effective option by avoiding individual optical mounts and holders for each element in the interferometer system.

Figure 4A:
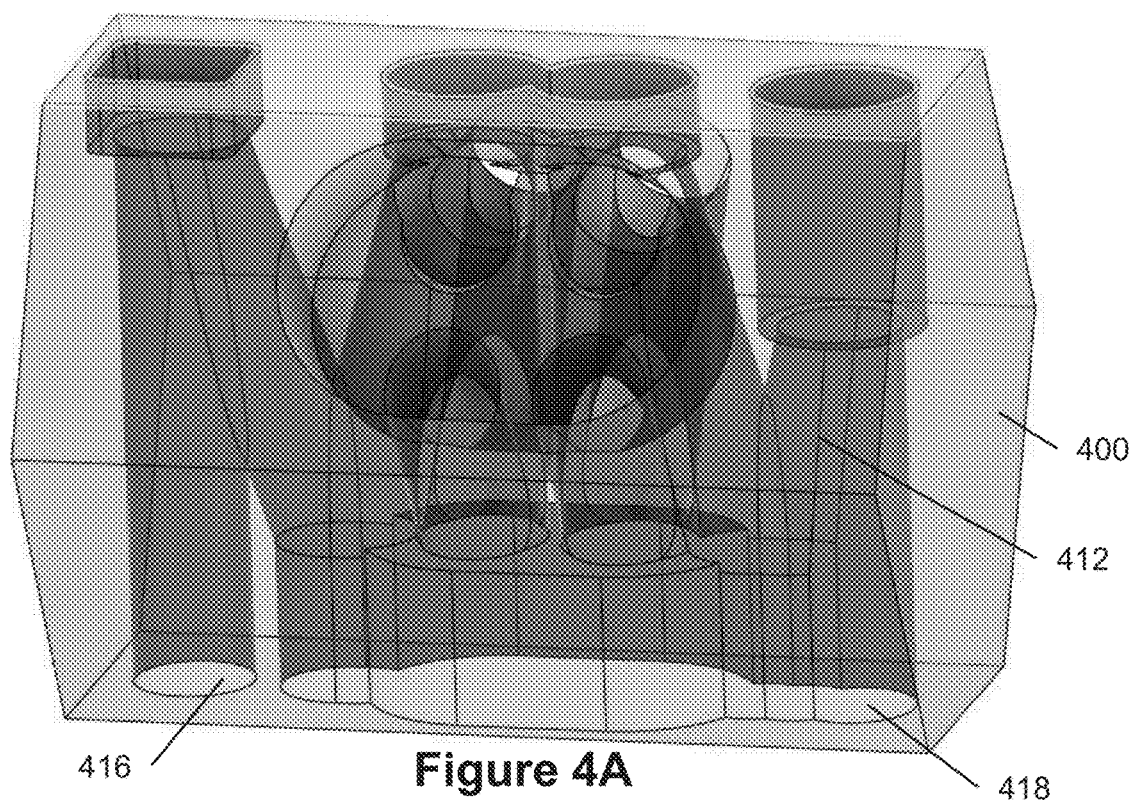
FIGS. 4A-4C illustrate various views of a monolithic support structure used in the construction of a monolithic reflective SHS interferometer system in accordance with various embodiments of the invention.
Figure 4B:
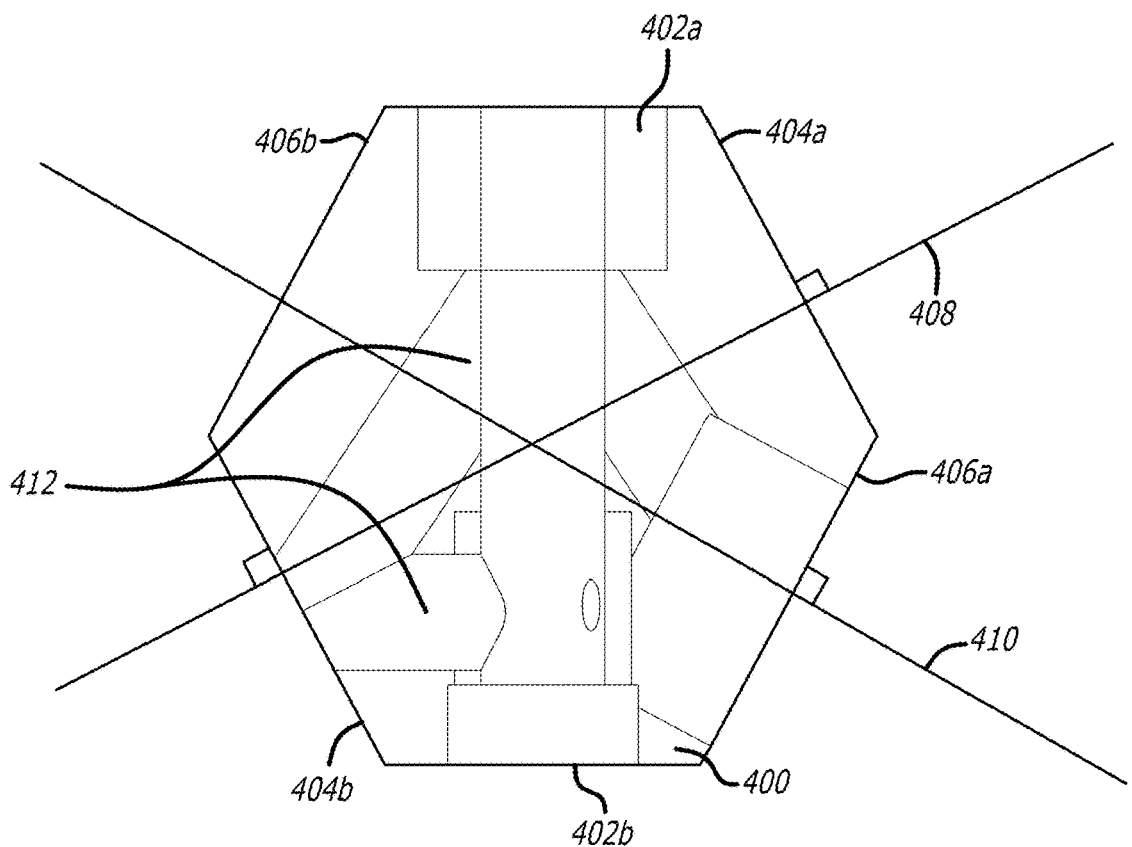
Figure 4C:
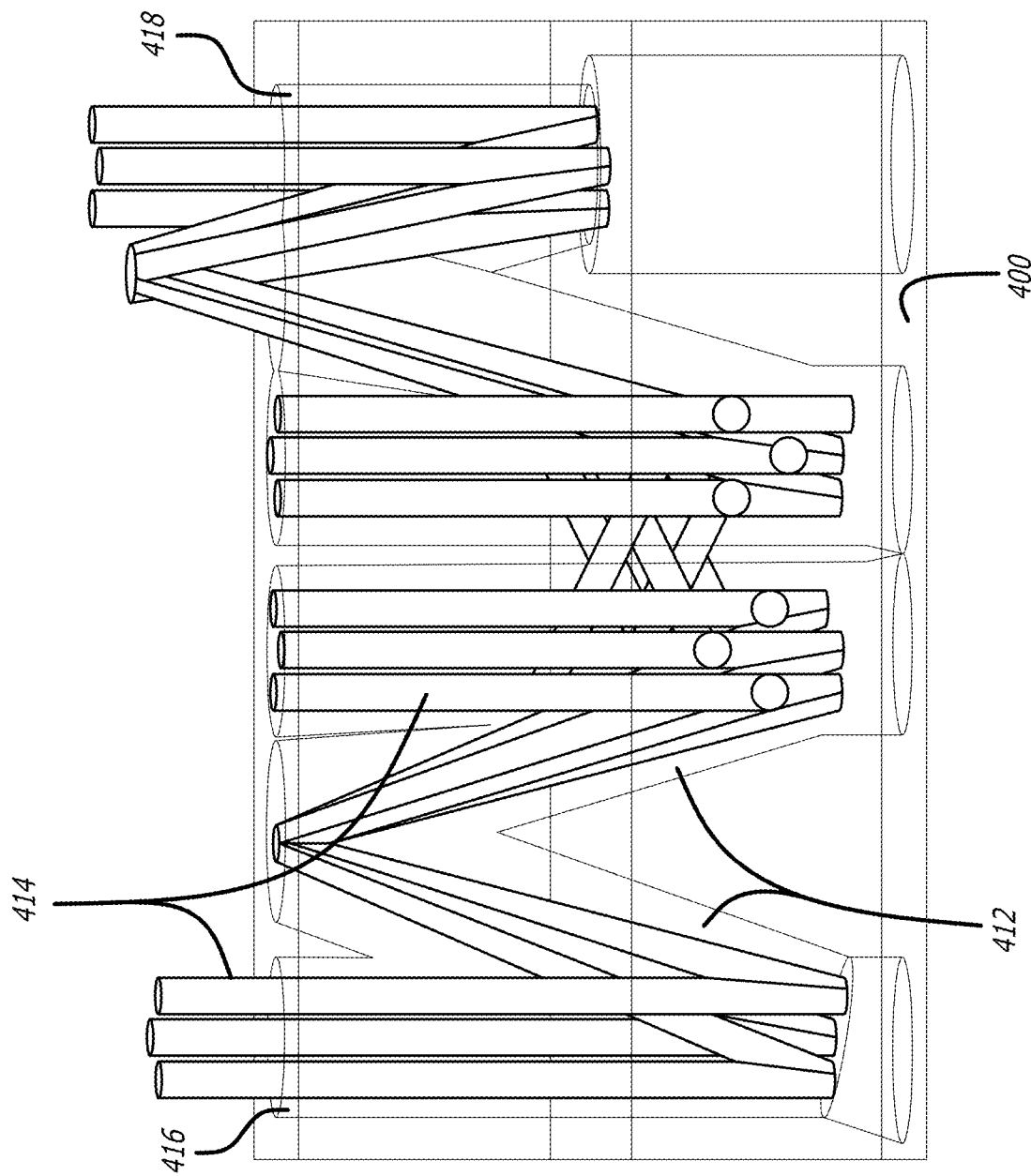

FIGS. 4A-4C provide examples of various embodiments of a monolithic reflective SHS interferometer system in accordance with many embodiments. Many embodiments provide a monolithic supporting structure (or body), where monolithic refers to a single piece of a single material, such as a solid block. In various embodiments, the monolithic structure is drilled, carved, polished, or otherwise formed to house additional components, rather than one or more pieces bent, molded, or fixed into a specific structure, such as structures with welds and/or seams to hold a position. In many embodiments, the monolithic supporting structure is formed from a solid block 400. Certain embodiments utilize a block in the shape of a hexagonal prism. In many embodiments, opposing faces 402a, 402b, 404a, 404b, 406a, 406b in the hexagonal cross-section are polished such that the opposing faces are aligned, as shown in FIG. 4B by lines 408, 410. By aligning the opposing faces, optical components (e.g., mirrors) can be mounted on opposite faces in a predefined aligned position—e.g., without additional steps to align the components after mounting the components. In many embodiments, block 400 includes channels 412 within the body, where the channels form the optical path as light traverses the monolithic reflective SHS interferometer system. Such channels 412 are formed via carving, drilling, grinding, etc. FIG. 4C illustrates a ray trace of light 414 traversing block 400, such that reflective surfaces (e.g., mirrors, gratings, etc.; not illustrated) direct the light through the channels from an incoming light opening 416 of the block to an outgoing light opening 418 of the block.

Figures 5A, 5B, 5C:
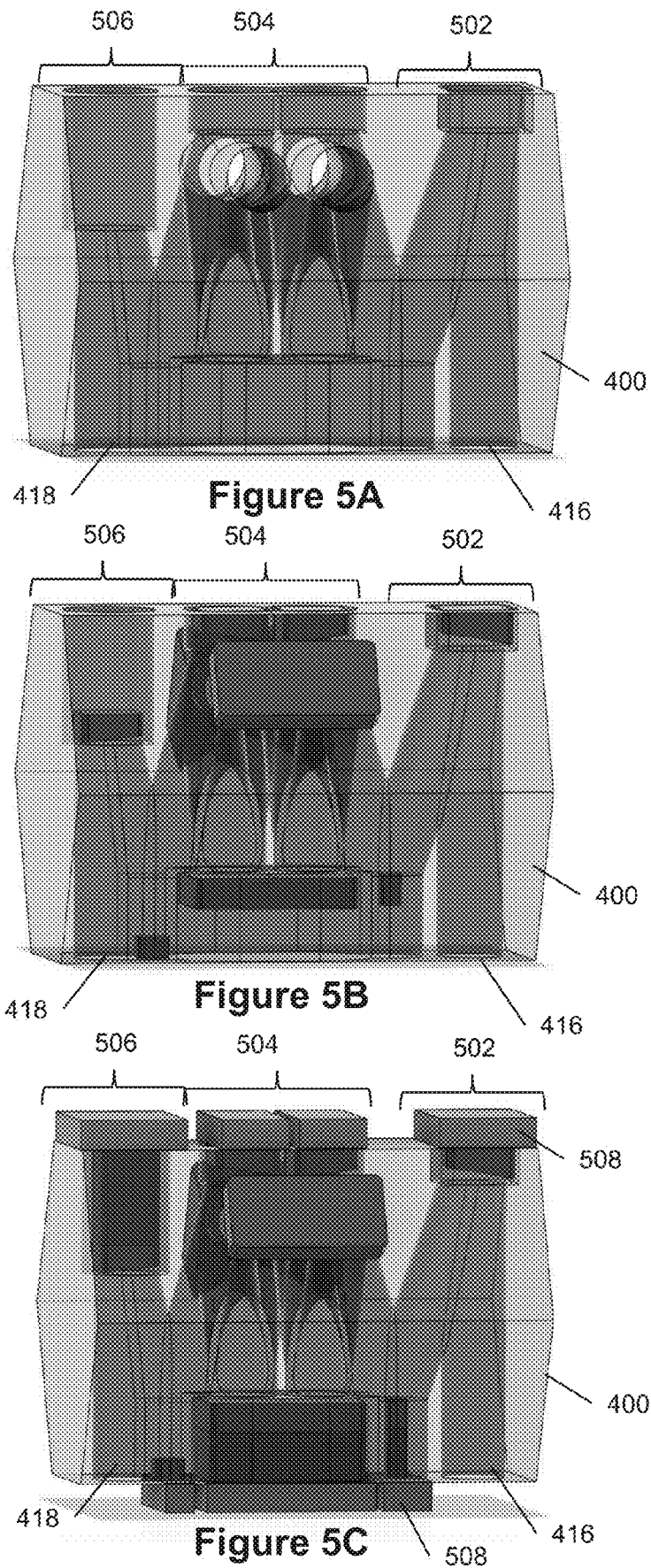
FIGS. 5A-5C illustrate assembly of a monolithic reflective SHS interferometer system in accordance with various embodiments of the invention.

FIGS. 5A-5C illustrate assembly of a reflective SHS interferometer system, in accordance with many embodiments. In particular, FIG. 5A illustrates a completed block 400, where opposing faces are aligned, and channels have been formed. FIG. 5B illustrates placement of the optical elements on block 400. Region 502 shows the input optics, which direct light from an incoming light opening 416 to a reflective SHS core section 504 (details regarding a reflective SHS are described in FIGS. 1A-1C and associated text). Finally, region 506 possesses the output optics to direct light from the reflective SHS to an outgoing light opening 418. Various embodiments use an off-axis parabolic mirror to redirect light at different angles.

In many embodiments, a sensor, or detector, can be affixed to a face of block 400 at outgoing light opening 418, to obtain data from the reflective SHS interferometer system. Various embodiments incorporate a one-dimensional (1D) array detector, a two-dimensional (2D) array detector, a photomultiplier tube, a diode, or any other suitable sensor for detection of data.

Figure 6:
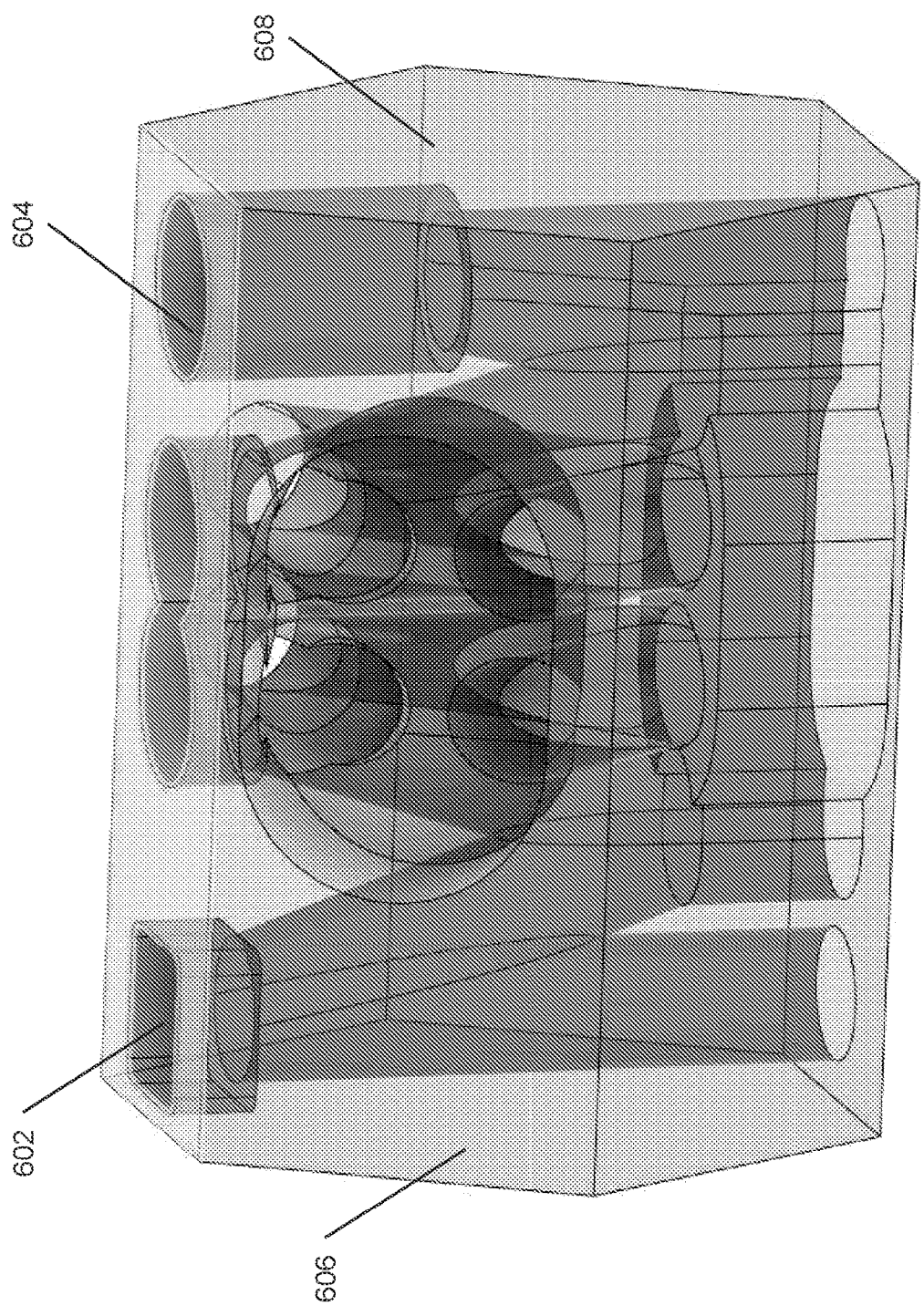
FIG. 6 illustrates an exemplary monolithic support structure with clearance holes in accordance with various embodiments of the invention.

In certain embodiments, the position of some optical components is inset from a face of block 400. For example, if a mirror does not have a flat face that can be directly attached to a flat face of block 400, a back of the optical component can be attached to a frame block 508, which is affixed to a face of block 400. FIG. 6 illustrates a block 400 with clearance holes to allow for the inset of certain optical elements. In various embodiments, clearance holes can be square 602 or round 604. Round clearance holes 604 are preferred in some embodiments, due to ease of crating via a drill, whereas square clearance holes 602 may require more complex, 2D contour cutting.

A monolithic design, such as described herein, allows for miniaturization of reflective SHS interferometer systems by removing moving parts, fixtures, mounts, holders, etc. As such, many embodiments have a linear length (e.g., from face 606 to face 608) of approximately 30 mm (±5 mm), 50 mm (±5 mm), 70 mm (±5 mm), 150 mm (±15 mm), 300 mm (±15 mm), 700 mm (±25 mm), although different configurations may vary. In such miniaturized embodiments, the roof mirror and the flat mirror can be separated by a short distance, such the roof mirror and the flat mirror by no more than 10 mm, 15 mm, 20 mm, 25 mm, 30 mm, 35 mm, 40 mm, 45 mm, 50 mm, 55 mm, 60 mm, 65 mm. Additionally, with the smaller size, various embodiments possess a combined mass (e.g., total mass of a supporting structure, mirrors, gratings, sensor/detector, and frame blocks) of approximately 50 g (±5 g) to approximately 400 g (±25 g), which allow for various embodiments to be deployed on spacecraft with minimal payload mass, volume, and launching cost. Additionally, this small form factor allows for many embodiments to be deployed on small space platforms, such as cubesats.

As described herein, many embodiments allow for the alignment of all components; provide more stability and robustness against vibration, shock, and thermal variation; eliminates moving parts; eliminates separate mounting fixtures; reduces mass and volume; and enables super compact systems.

Figure 7A:
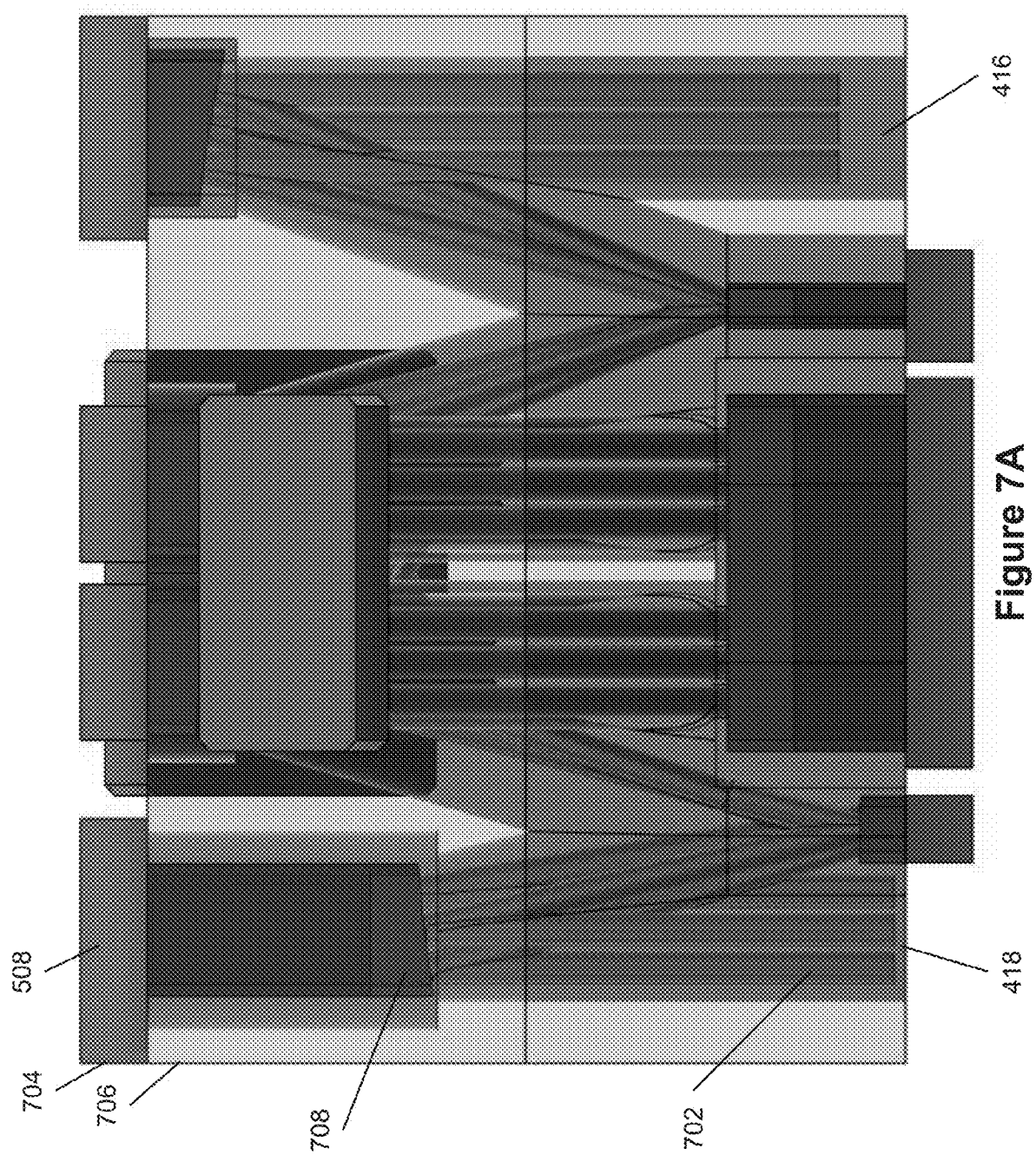
FIGS. 7A-7B illustrate various views of a monolithic reflective SHS interferometer system with ray tracing and alignment of frame blocks in accordance with various embodiments of the invention.
Figure 7B:
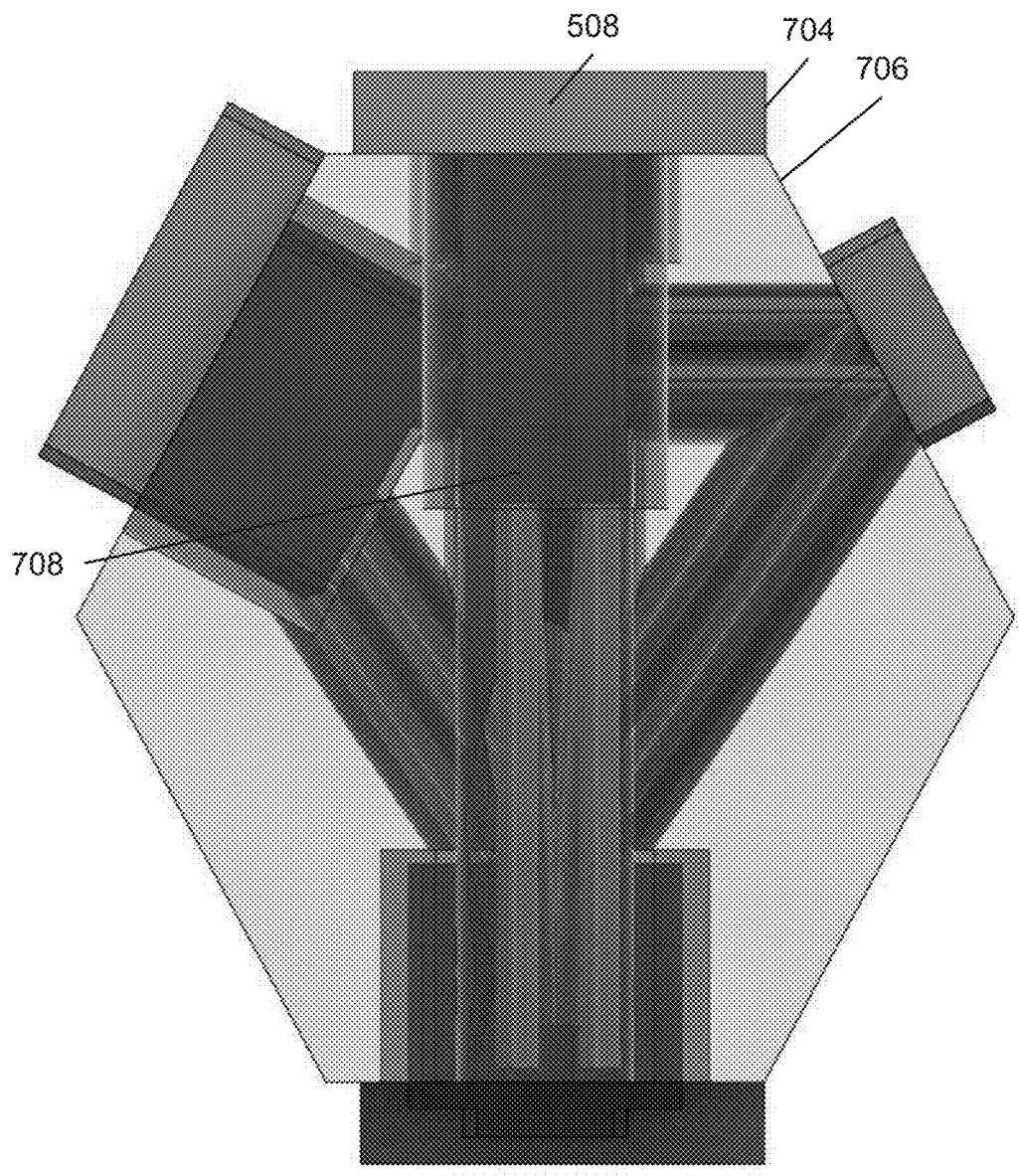
Figure 7C:
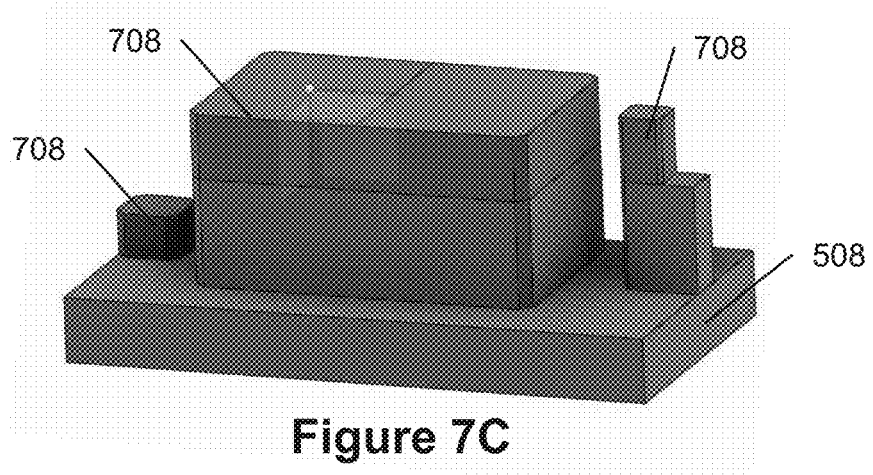
FIG. 7C illustrates an exemplary frame block with multiple optical components in accordance with various embodiments of the invention.

FIGS. 7A-7C illustrate views of an exemplary reflective SHS interferometer system along with ray traces of light 702 through the system from incoming light opening 416 to outgoing light opening 418. As illustrated in FIGS. 7A-7B, some frame blocks 508 possess one or more edges 704 that align with an edge 706 of block 400, which can aid in alignment of a frame block 508 and its associated optical component 708. As illustrated in FIG. 7C, some embodiments construct a single frame block 508 for optical components along one face of block 400. FIG. 7D illustrates an open view of an exemplary reflective SHS interferometer system, where outgoing light opening 418 includes a detector 710 to collect data (e.g., fringes) from the outgoing light.

Figure 8:
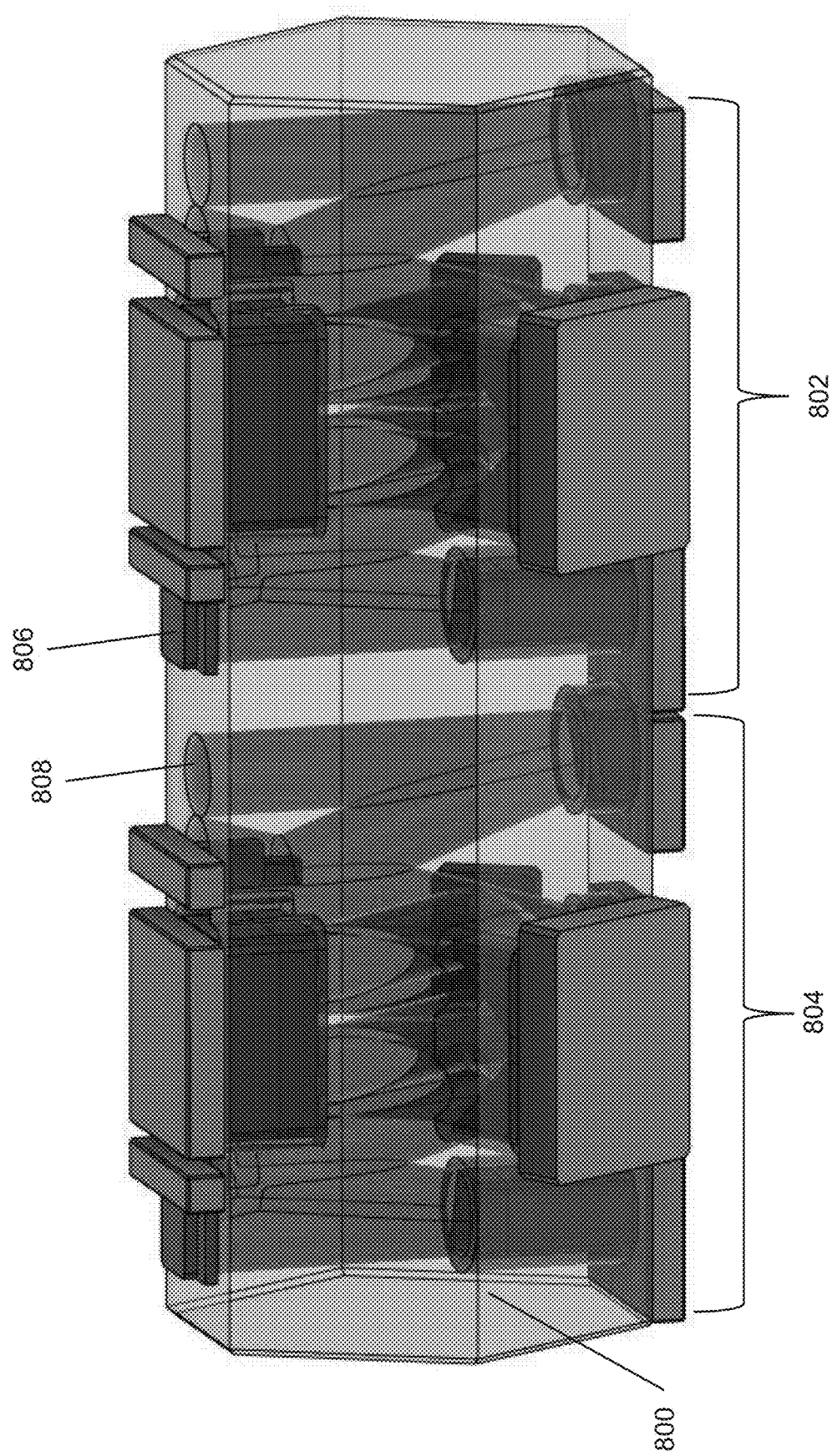
FIG. 8 illustrates an exemplary multichannel reflective SHS interferometer system in accordance with various embodiments of the invention.

As numerous embodiments have optical components mounted directly to a supporting structure or body, such embodiments do not have moving parts (e.g., rotating flat mirror 106 and rotating roof mirror 108; FIG. 3). Therefore, some embodiments are limited to a specific bandpass. However, as many embodiments allow for miniaturization, additional embodiments incorporate multiple reflective SHS interferometer systems into a single supporting structure or body. FIG. 8 illustrates an exemplary dual channel design, in accordance with some embodiments. In some dual-channel embodiments, a supporting structure 800 is elongated to allow for a first reflective SHS interferometer system 802 and a second reflective SHS interferometer system 804. In such embodiments reflective SHS interferometer systems 802, 804 are configured for different bandpasses, such that each reflective SHS interferometer system detects different wavelengths of light. It should be noted that while FIG. 8 illustrates a dual channel system, additional embodiments can incorporate 3, 4, 5, 6, 7, 8, or more reflective SHS interferometer systems into a single body 800, such that a broad spectrum of wavelengths can be detected simultaneously. Furthermore, while FIG. 8 illustrates the reflective SHS interferometer systems 802, 804 oriented the same direction (e.g., a detector 806 for the first reflective SHS interferometer system 802 is proximal to the incoming light opening 808 of the second reflective SHS interferometer system 804), additional embodiments orient the reflective SHS interferometer systems 802, 804 in an opposing direction, such that incoming light openings of the reflective SHS interferometer systems 802, 804 are proximal to each other or so detectors of the reflective SHS interferometer systems 802, 804 are proximal to each other. In embodiments with proximal detectors, some embodiments incorporate a single detector for the neighboring reflective SHS interferometer systems. In some of these single-detector embodiments, different sections or regions of a detector can be used for each reflective SHS interferometer system.

In order to reduce physical stresses in embodiments, many embodiments utilize the same material for most components (e.g., supporting structure, optical components, mirrors, frame blocks, etc.), whereas a detector may be constructed of different materials (e.g., silicon, electronics, etc.) for the detection of a signal exiting a RCSHS in accordance with many embodiments. By all components being constructed of the same material, vibrational, thermal, and other physical stresses are minimized. Suitable materials include glass (e.g., BK7 glass, fused silica), ceramics (including low expansion ceramics, such as ZERODUR® and CLEARCERAM®), sapphire, water clear zinc sulfide, single-crystalline materials, polycrystalline materials, metals (e.g., titanium, aluminum, steel (including stainless steel), copper, invar, other suitable metals, and mixtures and alloys thereof), plastics, and/or any other suitable material. In many embodiments, the components are optically bonded or joined via an adhesive or mechanical fastener.

To construct various embodiments, multi-axis CNC machining can be used, such as 3-axis, 4-axis, and/or 5-axis CNC machining. Additional embodiments utilize ultrasonic CNC machining, 3D printing, wire EDM, injection molding, and/or waterjet to construct the various components (e.g., supporting structure, optical components, frame blocks, etc.)

Aligning a Monolithic Reflective SHS Interferometer System

Figure 9B:
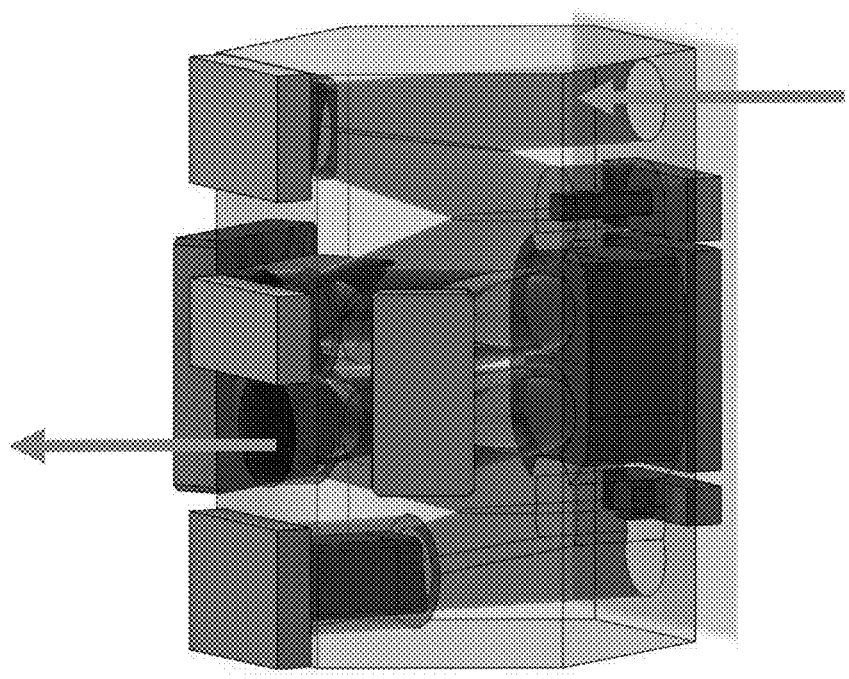
Figure 9A:
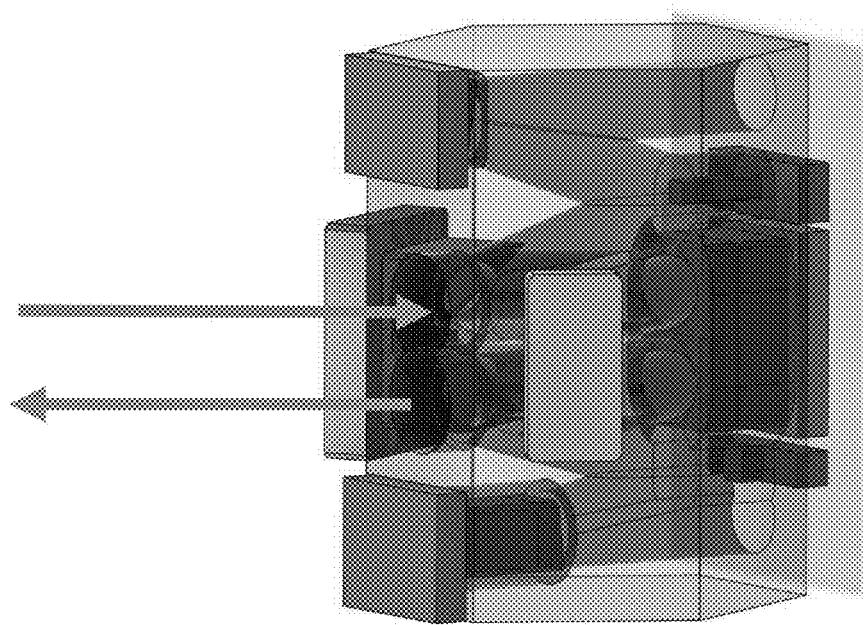

Turning to FIG. 9A-9C, an example method for calibrating a monolithic reflective SHS interferometer system is illustrated. In some embodiments, this alignment allows for minor changes to a supporting structure or body just prior to final completion of a deployable monolithic reflective SHS interferometer system. However, some embodiments align a template or model monolithic reflective SHS interferometer system, which can then be used as a model for replication of deployable monolithic reflective SHS interferometer systems.

As illustrated in FIG. 9A, certain embodiments initially align the reflective SHS core, where the deflecting mirrors to guide incoming light into the reflective SHS core and to guide outgoing light from the reflective SHS core are removed, and a new light source is used to introduce light into the reflective SHS core. To align the system, faces of the supporting body, optical components, or frame blocks can be polished to make sure the light traverses the optical path of the reflective SHS core.

A subsequent alignment step is illustrated in FIG. 9B, where various embodiments align the input optics by introducing light into the incoming light opening of the system. As illustrated in FIG. 9A, the deflecting mirror for output light from the reflective SHS core is removed to measure alignment of the input optics. To align the input optics, faces of the supporting body, optical components, or frame blocks can be polished to make sure the light traverses the optical path of the input optics and reflective SHS core.

FIG. 9C illustrates another subsequent step for calibrating the output optics. In such embodiments, all optical components are in their respective positions, and light traverses the entire system. To align the output optics, faces of the supporting body, optical components, or frame blocks can be polished to make sure the light traverses the optical path of the input optics, reflective SHS core, and the output optics.

It should be noted that, while not illustrated, some embodiments align output optics prior to alignment of input optics. For example, instead of the process illustrated in FIG. 9B, some embodiments remove the deflecting mirror for input light into the reflective SHS core to measure alignment of the output optics. To align the output optics, faces of the supporting body, optical components, or frame blocks can be polished to make sure the light traverses the optical path of reflective SHS core and output optics. Subsequently, alignment of the input optics would resemble the process illustrated in FIG. 9C, but the alignment process for the input optics polishes faces of the supporting body, optical components, or frame blocks to make sure the light traverses the optical path of the input optics, reflective SHS core, and the output optics.

Doctrine of Equivalents

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the foregoing examples and descriptions of various preferred embodiments of the present invention are merely illustrative of the invention as a whole, and that variations in the components or steps of the present invention may be made within the spirit and scope of the invention. Accordingly, the present invention is not limited to the specific embodiments described herein, but, rather, is defined by the scope of the appended claims.

What is claimed is:

1. A monolithic reflective spatial heterodyne spectrometer (SHS) interferometer system comprising:
reflective SHS core optics comprising a symmetric grating, a flat mirror, and a roof mirror;
incoming light optics;
outgoing light optics; and
a monolithic supporting structure formed from a single piece of a single material forming a body with a plurality of planar faces on its exterior and forming a plurality of channels within its interior, wherein the plurality of channels forms an optical path from an incoming light opening to an outgoing light opening;
wherein the incoming light optics are affixed to a face of the monolithic supporting structure and aligned with a channel in the plurality of channels, wherein the incoming light optics redirect light entering the incoming light opening through the optical path formed by the plurality of channels to the reflective SHS core optics;
wherein the symmetric grating is affixed to a face of the monolithic supporting structure and aligned with a channel in the plurality of channels such that the symmetric grating splits incoming light from the incoming light optics into two diffracted beams traveling in different, angularly offset directions;
wherein the flat mirror is affixed to a face of the monolithic supporting structure and aligned with a channel in the plurality of channels, wherein the flat mirror is affixed at a first angle in relation to the symmetric grating,
wherein the roof mirror is affixed to a face of the monolithic supporting structure and aligned with a channel in the plurality of channels, wherein the roof mirror is affixed at a second angle in relation to the symmetric grating, wherein the flat mirror and the roof mirror are disposed such that the flat mirror and the roof mirror reflect the diffracted beams in a cyclical common-path configuration through the optical path formed by the plurality of channels such that the diffracted beams diffract again off the symmetric grating to produce a localized fringe pattern;

wherein the outgoing light optics are affixed to a face of the monolithic supporting structure, wherein the outgoing light optics redirect the light exiting the reflective SHS core optics through the optical path formed by the plurality of channels to the outgoing light opening; and wherein opposing faces in the plurality of planar faces of the monolithic supporting structure are aligned to such that optical components can be mounted to the monolithic supporting structure without independent alignment.

2. The monolithic reflective SHS interferometer system of claim 1, wherein the faces of the monolithic supporting structure are aligned to generate a heterodyne condition in the SHS core optics for one wavelength, the heterodyne condition being satisfied when there exists a heterodyne wavelength $\lambda_0$ where the two diffracted beams exit the reflective spatial heterodyne spectrometer in normal angle and do not produce a localized fringe pattern.

3. The monolithic reflective SHS interferometer system of claim 1, wherein the roof mirror and the flat mirror are separated by a distance of no more than 70 mm.

4. The monolithic reflective SHS interferometer system of claim 1, wherein the roof mirror and the flat mirror are separated by a distance of no more than 25 mm.

5. The monolithic reflective SHS interferometer system of claim 1, wherein the monolithic supporting structure has a linear length of approximately 30 mm.

6. The monolithic reflective SHS interferometer system of claim 1, wherein the SHS system has a mass of approximately 400 g.

7. The monolithic reflective SHS interferometer system of claim 1, wherein the SHS system has a mass of approximately 50 g.

8. The monolithic reflective SHS interferometer system of claim 1, wherein the monolithic supporting structure is made of glass, ceramic, sapphire, zinc sulfide, a single-crystalline material, a polycrystalline material, a plastic, a metal, or a metal alloy.

9. The monolithic reflective SHS interferometer system of claim 1, wherein the monolithic supporting structure is made of fused silica glass, BK7 glass, ceramic, low expansion ceramic, sapphire, water clear zinc sulfide, or metal.

10. The monolithic reflective SHS interferometer system of claim 1, wherein the monolithic supporting structure is made of titanium, aluminum, stainless steel, or copper.

11. The monolithic reflective SHS interferometer system of claim 1, wherein the incoming light optics comprise at least one off-axis parabolic mirror.

12. The monolithic reflective SHS interferometer system of claim 1, wherein the outgoing light optics comprise at least one off-axis parabolic mirror.

13. The monolithic reflective SHS interferometer system of claim 1, further comprising a sensor to record the localized fringe pattern, wherein the sensor is affixed to a face of the monolithic supporting structure such that light exiting the outgoing light opening intercepts the sensor.

14. The monolithic reflective SHS interferometer system of claim 13, wherein the sensor is selected from the group consisting of: a 1D array detector, a 2D array detector, a photomultiplier tube, and a diode.

15. The monolithic reflective SHS interferometer system of claim 1, wherein the SHS core optics, the incoming light optics, the outgoing light optics, and the monolithic supporting structure are made of the same material.

16. The monolithic reflective SHS interferometer system of claim 1, further comprising a frame block affixed to a face of the monolithic supporting structure, wherein at least one of the incoming light optics, the outgoing light optics, the flat mirror, the roof mirror, and the symmetric grating is affixed to the frame block.

17. The monolithic reflective SHS interferometer system of claim 1, wherein the symmetric grating, the flat mirror, and the roof mirror are affixed via an adhesive or via optical bonding.

18. The monolithic reflective SHS interferometer system of claim 1, further comprising:

a second plurality of channels, wherein the second plurality of channels forms a second optical path from a second incoming light opening to a second outgoing light opening;

a second reflective SHS core optics comprising a second symmetric grating, a second flat mirror, and a second roof mirror, wherein the second symmetric grating is affixed to a face of the monolithic supporting structure such that the second symmetric grating splits an incoming light into two diffracted beams traveling in different, angularly offset directions, wherein the second flat mirror is affixed to a face of the monolithic supporting structure at a first angle in relation to the second symmetric grating, wherein the second roof mirror is affixed to a face of the monolithic supporting structure at a second angle in relation to the second symmetric grating, and wherein the second flat mirror and the second roof mirror are disposed such that the second flat mirror and the second roof mirror reflect the diffracted beams in a cyclical common-path configuration such that the diffracted beams diffract again off the second symmetric grating to produce a localized fringe pattern;

a second incoming light optics affixed to a face of the monolithic supporting structure, wherein the second incoming light optics redirect the light entering the second incoming light opening through the optical path formed by the second plurality of channels to the second SHS core optics; and a second outgoing light optics affixed to a face of the monolithic supporting structure, wherein the second outgoing light optics redirect the light exiting the second SHS core optics through the optical path formed by the second plurality of channels to the second outgoing light opening.

19. A monolithic reflective spatial heterodyne spectrometer (SHS) interferometer system comprising:

reflective SHS core optics comprising a symmetric grating, a flat mirror, and a roof mirror;

incoming light optics;

a monolithic supporting structure formed from a single piece of a single material forming a body with a plurality of planar faces on its exterior and forming a plurality of channels within its interior, wherein the plurality of channels forms an optical path from an incoming light opening to an outgoing light opening;

wherein the incoming light optics are affixed to a face of the monolithic supporting structure and aligned with a channel in the plurality of channels, wherein the incoming light optics redirect light entering the incoming light opening through the optical path formed by the plurality of channels to the reflective SHS core optics;

wherein the symmetric grating is affixed to a face of the monolithic supporting structure and aligned with a channel in the plurality of channels such that the symmetric grating splits incoming light from the incoming light optics into two diffracted beams traveling in different, angularly offset directions;

wherein the flat mirror is affixed to a face of the monolithic supporting structure and aligned with a channel in the plurality of channels, wherein the flat mirror is affixed at a first angle in relation to the symmetric grating, wherein the roof mirror is affixed to a face of the monolithic supporting structure and aligned with a channel in the plurality of channels, wherein the roof mirror is affixed at a second angle in relation to the symmetric grating, wherein the flat mirror and the roof mirror are disposed such that the flat mirror and the roof mirror reflect the diffracted beams in a cyclical common-path configuration through the optical path formed by the plurality of channels such that the diffracted beams diffract again off the symmetric grating to produce a localized fringe pattern; and wherein opposing faces in the plurality of planar faces of the monolithic supporting structure are aligned to such that optical components can be mounted to the monolithic supporting structure without independent alignment.

20. A monolithic reflective spatial heterodyne spectrometer (SHS) interferometer system comprising:

reflective SHS core optics comprising a symmetric grating, a flat mirror, and a roof mirror;

outgoing light optics; and a monolithic supporting structure formed from a single piece of a single material forming a body with a plurality of planar faces on its exterior and forming a plurality of channels within its interior, wherein the plurality of channels forms an optical path from an incoming light opening to an outgoing light opening;

wherein the symmetric grating is affixed to a face of the monolithic supporting structure and aligned with a channel in the plurality of channels such that the symmetric grating splits incoming light into two diffracted beams traveling in different, angularly offset directions;

wherein the flat mirror is affixed to a face of the monolithic supporting structure and aligned with a channel in the plurality of channels, wherein the flat mirror is affixed at a first angle in relation to the symmetric grating, wherein the roof mirror is affixed to a face of the monolithic supporting structure and aligned with a channel in the plurality of channels, wherein the roof mirror is affixed at a second angle in relation to the symmetric grating, wherein the flat mirror and the roof mirror are disposed such that the flat mirror and the roof mirror reflect the diffracted beams in a cyclical common-path configuration through the optical path formed by the plurality of channels such that the diffracted beams diffract again off the symmetric grating to produce a localized fringe pattern;

wherein the outgoing light optics are affixed to a face of the monolithic supporting structure, wherein the outgoing light optics redirect the light exiting the reflective SHS core optics through the optical path formed by the plurality of channels to the outgoing light opening; and wherein opposing faces in the plurality of planar faces of the monolithic supporting structure are aligned to such that optical components can be mounted to the monolithic supporting structure without independent alignment.

* * * * *